United States Patent
Sengupta et al.

(10) Patent No.: US 11,709,998 B2
(45) Date of Patent: Jul. 25, 2023

(54) DYNAMIC AND UNSCRIPTED VIRTUAL AGENT SYSTEMS AND METHODS

(71) Applicant: Accenture Global Solutions Limited, Dublin (IE)

(72) Inventors: Shubhashis Sengupta, Bangalore (IN); Ankur Gakhar, Haryana (IN); Sarvesh Maheshwari, Udaipur (IN); Roshni Ramesh Ramnani, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 248 days.

(21) Appl. No.: 17/001,308

(22) Filed: Aug. 24, 2020

(65) Prior Publication Data
US 2021/0073474 A1 Mar. 11, 2021

(30) Foreign Application Priority Data
Sep. 6, 2019 (IN) .............................. 201941035949

(51) Int. Cl.
G06F 40/35 (2020.01)
G06F 40/295 (2020.01)
G06N 5/02 (2023.01)
H04L 51/02 (2022.01)

(52) U.S. Cl.
CPC ............ *G06F 40/35* (2020.01); *G06F 40/295* (2020.01); *G06N 5/02* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 10,387,575 B1* | 8/2019 | Shen | ....................... | G06F 40/35 |
| 10,460,028 B1* | 10/2019 | Flann | ..................... | G06F 40/211 |
| 10,592,610 B1* | 3/2020 | Shen | ....................... | G06F 40/30 |
| 2015/0039292 A1* | 2/2015 | Suleman | ............... | G06F 40/216 |
| | | | | 704/9 |
| 2016/0124937 A1* | 5/2016 | Elhaddad | .............. | G06F 40/205 |
| | | | | 704/9 |
| 2018/0213062 A1 | 7/2018 | Muthyala et al. | | |

(Continued)

OTHER PUBLICATIONS

Renzo Angles, Marcelo Arenas, Pablo Barceló, Aidan Hogan, Juan Reutter, Domagoj Vrgoc; Foundations of Modern Query Languages for Graph Databases; URL: https://arxiv.org/pdf/1610.06264.pdf (Year: 2017).*

(Continued)

*Primary Examiner* — Richa Mishra
(74) *Attorney, Agent, or Firm* — Plumsea Law Group, LLC

(57) ABSTRACT

Systems and methods that offer significant improvements to current chatbot conversational experiences are disclosed. The proposed systems and methods are configured to manage conversations in real-time with human customers based on a dynamic and unscripted conversation flow with a virtual assistant. In one embodiment, a knowledge graph or domain model represents the sole or primary source of information for the virtual assistant, thereby removing the reliance on any form of conversational modelling. Based on the information provided by the knowledge graph, the virtual agent chatbot will be equipped to answer customer queries, as well as demonstrate reasoning, offering customers a more natural and efficacious dialogue experience.

20 Claims, 16 Drawing Sheets

(56) References Cited

U.S. PATENT DOCUMENTS

| | | |
|---|---|---|
| 2018/0218042 A1 | 8/2018 | Krishnan et al. |
| 2019/0212879 A1 | 7/2019 | Anand et al. |
| 2019/0236469 A1* | 8/2019 | Canim .................. G06N 5/022 |
| 2019/0258723 A1 | 8/2019 | Taycher et al. |
| 2019/0279104 A1* | 9/2019 | Brake ...................... G06N 5/04 |
| 2020/0176098 A1* | 6/2020 | Lucas .................... G16H 70/40 |
| 2020/0410012 A1* | 12/2020 | Moon ..................... G06N 5/022 |
| 2021/0073468 A1* | 3/2021 | Deshmukh ............. G06Q 10/10 |

OTHER PUBLICATIONS

Kensho Derived Wikimedia Dataset; Kensho R&D; https://www.kaggle.com/kenshoresearch/kensho-derived-wikimedia-data [accessed on Aug. 26, 2020].

Yago; https://github.com/yago-naga/yago3 [accessed on Aug. 26, 2020].

Extended European Search Report dated Jan. 29, 2021 for European patent application No. 20193197.9.

* cited by examiner

US 11,709,998 B2

DYNAMIC AND UNSCRIPTED VIRTUAL AGENT SYSTEMS AND METHODS

CROSS-REFERENCE TO RELATED APPLICATION(S)

This application claims the benefit of Indian Provisional Patent Application No. 201941035949, filed Sep. 6, 2019, which is hereby incorporated by reference in its entirety.

TECHNICAL FIELD

The present disclosure generally relates to virtual assistant systems. More specifically, the present disclosure generally relates to systems and methods for providing dynamic and/or unscripted chatbot-based conversations.

BACKGROUND

Natural language understanding systems interpret the word sequences of user utterances. For example, natural language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks (also referred to herein as "goals" or "intents") include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

The capacity of a virtual assistant to be able to respond to a client query, and the extent to which the response adequately and appropriately resolves a query, often depends on the knowledge base and programmed competences of the virtual assistant. In particular, virtual assistants generally operate by applying programmed rules when responding to user queries. These rules determine the scope of queries that may be addressed by the virtual assistant, and the depth of the response that is provided.

Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user. However, the available systems are not able to effectively access or make use of the wealth of knowledge that may be provided by the speech content and strategies and/or solutions that were identified in previous conversations for similar tasks. Furthermore, in some cases, virtual assistants may attempt to provide a response that has little to no appreciation for the context of a dialogue with a customer. Without this context, the responses provided by an automated system will be limited and fail to address what is known as the 'human factor'.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

SUMMARY

Figure 1:
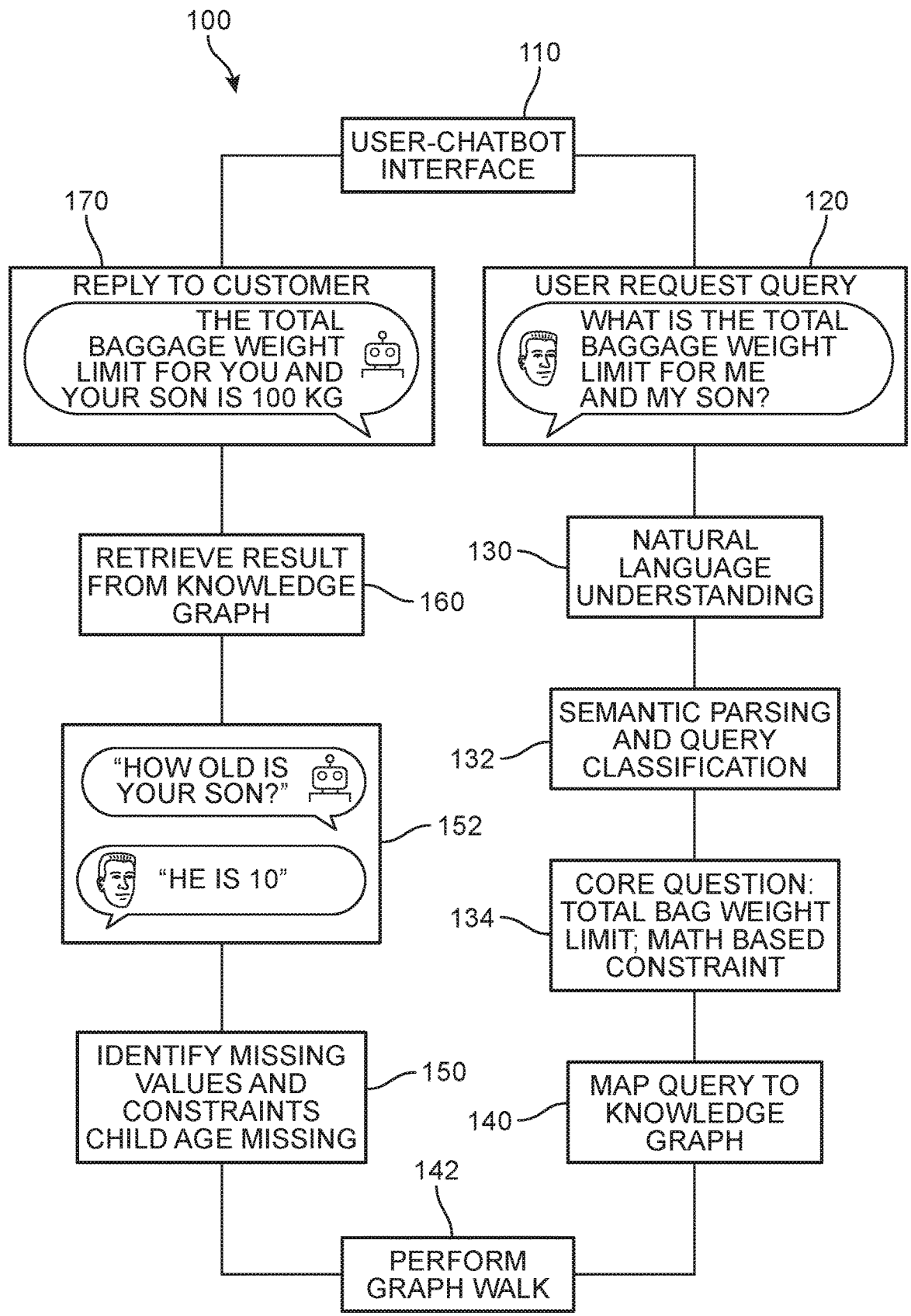
FIG. 1 is a schematic diagram of an overview of an embodiment of a dynamic chatbot system.

A system and method for responding dynamically to a user query is disclosed. The process takes a multi-label classification of the query and translates the data into Boolean, math, and process values. These values are used to identify and map entities and relationships from the query to a knowledge graph. A graph walk is performed that is specific to the semantic category of the entities and their relationships, to allow for the predicted or expected response or result to be identified. A graph walk is a sequence of vertices and edges of a knowledge graph. Vertices and/or edges may be repeated in graph walks. Nodes in the knowledge graph can be used to constrain the graph walk. In cases where the system determines the information is insufficient to generate an automated response, the chatbot is configured to automatically ask the customer for the missing values or these values may be gathered from the graph walk. Finally, the result of the query can be retrieved from the knowledge graph.

In some embodiments, the disclosed systems and methods may include a knowledge graph according to the systems and methods, which include conversation graphs, disclosed in U.S. patent application Ser. No. 16/588,291, filed Sep. 20, 2019 and entitled, "System and Method for Generation of Conversation Graphs," hereby incorporated by reference in its entirety.

The systems and methods disclosed herein offer significant advantages over conventional chatbots. The proposed systems and methods are configured to manage conversations in real-time with human customers based on a dynamic and unscripted conversation flow with a virtual assistant. In some embodiments, a knowledge graph or domain model represents the sole or primary source of information for the virtual assistant, thereby removing the reliance on any form of conversational modelling (e.g., to define entities and intents, or capturing states or conditions, etc.), greatly improving the efficiency of the system. Based on the information provided by the knowledge graph, the virtual agent chatbot will be equipped to answer customer queries, as well as demonstrate reasoning, offering customers a more natural and efficacious dialogue experience. In some embodiments, the chatbot will be able to learn from the customer and make meaningful recommendations with reference only to the information supplied by knowledge graphs that will continue to be updated and developed to ensure high-accuracy information.

Such an approach—in which a chatbot needs only rely on a knowledge graph to supply appropriate responses to a user's query—represents a powerful shift away from conventional conversational modeling techniques that require repeated training sessions based on user utterances, while tethering such utterances to a template of possible responses. This approach is highly scripted, and if a user strays from the approved templates, the system will be stymied. As will be discussed below, the proposed systems offer a conversational AI bot that can map free-form factoids, process-oriented requests, and logical queries to a knowledge graph to generate reliable responses that can encompass a wide range of unscripted dialogue (e.g., dialogue for which there has been no previous training). Implementation of a knowledge graph-based conversation system is a powerful mechanism by which a knowledge graph can be used to support and facilitate in semantic parsing, storage of information (e.g., facts about the domain), and creation of natural language text. The knowledge graph in the proposed embodiments thus serves a far more intelligent and resourceful role than conventional systems that make more limited use of knowledge graphs as only a type of primitive information repository or executing intent matching techniques. Furthermore, the code format offered by the proposed systems is reusable and easy for a domain designer to implement and maintain.

In one aspect, the disclosure provides a method of generating responses to a query. The method includes receiving, via a virtual chatbot, a first query, and automatically identifying a first entity for the first query. In some embodiments, the first entity may include a focus entity, a start entity, and/or other types of entities. The method further includes automatically accessing a knowledge graph associated with the virtual chatbot, and automatically identifying, based on at least the first entity, a first key node in the knowledge graph. For example, the first key node may be one of a plurality of key nodes each containing a topic related to the first entity. In addition, the method includes automatically performing a graph walk through a portion of the knowledge graph, the graph walk being constrained by at least the first key node, and automatically retrieving, via the graph walk, a first result from the knowledge graph. In some embodiments, the graph walk may include further constraints added by other entities. Furthermore, the method includes automatically presenting, via the virtual chatbot, a first response to the first query based on at least the first result.

In another aspect, the disclosure provides a system for generating responses to a query. The system includes a processor and machine-readable media including instructions which, when executed by the processor, cause the processor to receive, via a virtual chatbot, a first query, and to automatically identify a first entity for the first query. In some embodiments, the first entity may include a focus entity, a start entity, and/or other types of entities. The instructions further cause the processor to automatically access a knowledge graph associated with the virtual chatbot, and to automatically identify, based on at least the first entity, a first key node in the knowledge graph. For example, the first key node may be one of a plurality of key nodes each containing a topic corresponding to the first entity. In addition, the instructions cause the processor to automatically perform a graph walk through a portion of the knowledge graph, the graph walk being constrained by at least the first key node, and to automatically retrieve, via the graph walk, a first result from the knowledge graph. Furthermore, the instructions cause the processor to automatically present, via the virtual chatbot, a first response to the first query based on at least the first result.

In another aspect, the disclosure provides a system that includes one or more computers and one or more storage devices storing instructions that are operable, when executed by the one or more computers, to cause the one or more computers to receive, via a virtual chatbot, a first query, and to automatically identify a first entity for the first query. In some embodiments, the first entity may include a focus entity, a start entity, and/or other types of entities. The instructions also cause the one or more computers to automatically access a knowledge graph associated with the virtual chatbot, and to automatically identify, based on at least the first entity, a first key node in the knowledge graph. For example, the first key node may be one of a plurality of key nodes each containing a topic corresponding to the first entity. In addition, the instructions cause the one or more computers to automatically perform a graph walk through a portion of the knowledge graph, the graph walk being constrained by at least the first key node, and to automatically retrieve, via the graph walk, a first result from the knowledge graph. Finally, the instructions cause the one or more computers to automatically present, via the virtual chatbot, a first response to the first query based on at least the first result.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

For purposes of this application, a knowledge graph refers to a representation that captures the salient knowledge about a particular task. A knowledge graph is a structured representation of facts, consisting of entities, relationships and semantic descriptions. Entities can be real-world objects and abstract concepts, relationships represent the relation between entities, and semantic descriptions of entities and their relationships contain types and properties with a well-defined meaning. The knowledge graph includes an array of interconnected nodes and each connection represents a relationship with its own properties or attributes. As will be discussed below, in some embodiments, a portion of the knowledge graph that includes group of nodes can be isolated or extracted, where each node represents various properties, objects, subjects, and constraints, in order to respond to a specific query. In many cases, knowledge graphs can store and convey in a single network a large collection of information. As some examples, a knowledge graph encodes the domain entities, relationships, processes, and polices for a given business or organization. A generic semantic natural language processing engine can then be applied to user queries and retrieve the correct results from the knowledge graph. In addition, in some embodiments, a spreading activation function may be used when the system cannot determine an exact match for a concept that the user is referencing, allowing the system to 'pickup' the next nearest topic to extrapolate the information that the user is most likely seeking. The chatbot can then serve a more dynamic role, as will be described herein.

In different embodiments, the disclosed system and method may be part of a natural language understanding system. In some embodiments, the natural language understanding system comprises a sub-system of a virtual agent, also referred to as a virtual chatbot. The virtual agent takes in requests from a customer (or other end-user) and processes the requests before responding back to the customer. To process requests from a customer and respond appropriately, the virtual agent may include multiple subsystems or modules that help solve various subtasks. As one example, FIG. 1 shows an exemplary virtual agent interaction 100 including a series of processes that occur between a user request 120 (e.g., "What is the total baggage weight limit for me and my son?") and an answer 170 (e.g., "The total baggage weight limit for you and your son is 100 kg"). While the exemplary embodiment depicts a conversation that occurs through a chatbot interface 110, in other embodiments a virtual agent could communicate with a customer through other means including text-based communication (e.g., SMS), voice calls, and/or video communication (e.g., using Skype or Facetime).

Following the exemplary process characterized in FIG. 1, the request 102 is first processed by a natural language understanding ("NLU") system 130. The goal of NLU system 130 is to extract the meaning of the string of words into a sequence or smaller subset of words that can be used by systems downstream of NLU system 130. For example, NLU system 130 may process a received message (the customer's request 120) into a set of words that are each classified or otherwise categorized to move toward a determination of the user's intent.

For example, NLU system 130 may apply semantic parsing (see FIGS. 6A and 6B) and query classification (see FIG. 5) techniques 132 to analyze the phrase "What is the total baggage weight limit for me and my son?" and make an initial assessment 134 that the customer is looking for information about bag weight limits (labeled as the core question), and that a math-based constraint applies to the core question. More specifically, in some embodiments, the NLU system 130 takes in a word sequence as input and outputs (1) the type of input that has been received (e.g., query, command, information, etc.) and (2) the constraints that apply to this input (e.g., math-based).

The outputs of NLU system 130, which provide the extracted meaning (also referred to as semantic content) of a word sequence, may then be used when submitting a query 140 to the appropriate knowledge graph. A graph walk 142 is performed during this stage. The graph walk 142 can detect whether the system needs any further information in order to understand and/or respond to the customer, such as missing values and constraints. For example, in this case, the graph walk determines that the child's age is needed and that this information is not presently available in an assessment step 150. The chatbot then generates and presents a question 152 via the chatbot interface 110 to the customer reflecting this ("How old is your son?"). In this case, the customer replies "He is 10". With this information, the system can proceed with retrieving the appropriate response from the knowledge graph in a retrieving step 160. Once the information is located and obtained, the answer 170 is generated and provided to the customer ("The total baggage weight limit for you and your son is 100 kg") via the chatbot interface 110. The system can be configured to use the wording of the initial question to express the answer to the customer, in an approach that can mimic or has some similarity to a communication technique known as active listening, thereby ensuring the customer feels heard and understood. It may be appreciated that the cycle represented by FIG. 1 may be repeated after each customer request (or other input), such that virtual agent continues a conversation with the customer until the customer goals have been met.

Figure 2:
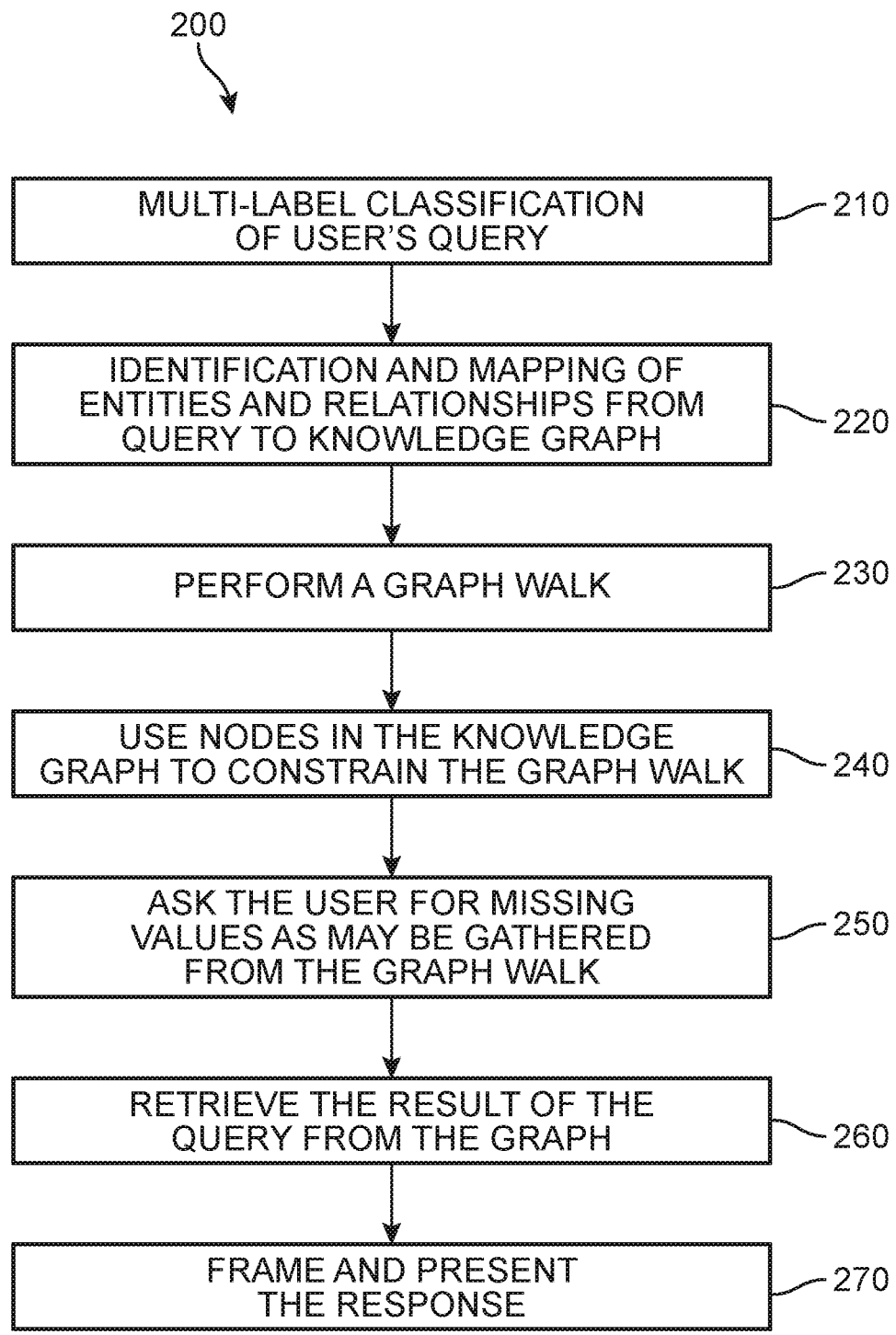
FIG. 2 is a schematic flow diagram of an embodiment of a dynamic chatbot system.

Referring now to FIG. 2, a process flow diagram 200 illustrates another embodiment of the approach introduced in FIG. 1. In a first step 210, the customer query is classified under one or more labels (also referred to herein as a query type), including but not limited to a Boolean label, a Math label, a Process label, and a Value label. Additional details regarding this classification will be discussed with reference to FIG. 5 below. This can also include the application of various NLU techniques (see FIG. 4). In a second step 220, entities and relationships present in the query are identified and mapped to the knowledge graph, including for example, the subject and object of the query. In a third step 230, a graph walk is performed that is specific to the semantic category of the identified entities and relationships, and a query result is expected. As a general matter, a graph walk refers to a semantic graph structure assessment that takes advantage of the encoding of the facts in the graph. A graph walk takes place to retrieve facts associated with the reachability and sematic structure of the graph nodes, where reachability refers to the ability to get from one node to another within a graph. The graph walk thus represents a traversal over a finite sequence of vertices (nodes) and edges of a knowledge graph. The selected path over which the walk occurs includes different node or vertices where the walk starts than where the walk ends.

A fourth step 240 that is associated with the third step 230 involves using the nodes of the knowledge graph to appropriately constrain the graph walk. In an optional fifth step 250, the chatbot will ask the user for missing values (if any) that may have been detected through the graph walk. The result of the query is then retrieved from the knowledge graph in a sixth step 260, and this result is framed as an answer by reusing the words of the original user query in a seventh step 270 and the data obtained from the knowledge graph.

As noted earlier, using a knowledge graph as the primary or even sole source of information for automated chatbots offers significant advantages over conventional virtual agent systems. One major benefit provided by this use of a knowledge graph is its extremely flexible structure. As a general matter, the ontology of a domain graph can be readily extended and revised as new data arrives. As more conversations and associated data are collected about similar topics, intents, goals, and/or tasks, the knowledge graph easily accommodates updates and data growth, supporting a continuously running data pipeline that is adept at adding new knowledge to the graph, and allows for graph refinements as new information (e.g., conversation data and other knowledge) arrives.

Thus, a knowledge graph may be understood to refer to a living graph that acquires and integrates information into an ontology and applies a reasoner to derive new knowledge. Knowledge graphs present connections (relationships) in the data, and allows for the ready transfer of new data items as they are added into the data pool. In addition, the meaning of the data is encoded alongside the data in the graph, in the form of the ontology. Knowledge graphs offer end-users the ability to submit queries in a natural language-style, where the meaning of the data is typically expressed in terms of entity and relation names that are familiar to those interested in the given domain. Because the underlying basis of a knowledge graph is the ontology, specifying the semantics of the data, the knowledge graph further allows implicit information to be derived from explicitly asserted data that would otherwise be hard to discover.

In some embodiments, portions of information represented by the knowledge graph can be broadly classified by various query categories. As some examples, such query categories can include (1) existence of a node; (2) existence of a link; (3) existence value of a node or attribute; (4) extracting value from a relationship; (5) math queries (e.g., comparator, calculator, aggregator, etc.); (6) logical queries (e.g., AND, OR, NOT, etc.); and (7) Boolean queries.

In different embodiments, in order to broaden the knowledge source available for use by the chatbot, the knowledge graphs used by the proposed systems can be linked to external hierarchy-based and/or relationship-based (structured so that each relationship has a meaning) designs or other external sources of knowledge, as well as sources of common sense reasoning. In one exemplary embodiment, the integration between these sources is based on a platform that implements a three-tier graph network that includes (a) the internal domain-specific knowledge graph, (b) a world knowledge graph of the domain, such as KENSHO (see, e.g., https://www.kaggle.com/kenshoresearch/kensho-derived-wikimedia-data, hereby incorporated by reference) and YAGO (see, e.g., htpps://github.com/yago-naga/yago3 hereby incorporated by reference) graphs, or other open source knowledge bases that comply with the system's ontological standards, and (c) an external semantic graph that describes human common-sense knowledge.

To solve domain-specific tasks that fall outside the scope of an internal domain-specific knowledge graphs, external knowledge bases on specific domains are designed and collected. Some notable domains include life science, health care, and scientific research, covering complex domain and relations such as compounds, diseases and tissues. Non-limiting examples of domain specific knowledge graphs that may be accessed by the proposed embodiments are ResearchSpace, a cultural heritage knowledge graph; UMLS, a unified medical language system; GeneOntology7, a gene ontology resource; SNOMED CT8, a commercial clinical terminology; and a medical knowledge graph from Yidu Research9. Other publicly available datasets offering general ontological knowledge include WordNet, Cyc, DBpedia, YAGO, Freebase, NELL, and Wikidata. Other non-limiting examples of external knowledge bases and graphs that may be used include those generated via ConceptNet, WordNet, HowNet, FrameNet, OpenCyc, and other semantic networks.

Thus, if the system is unable to find the knowledge required to respond to a query in its own domain knowledge graph at the first-tier, it can access the second-tier world knowledge graph. If the world knowledge graph is insufficient for the needs of the query, a third-tier external knowledge base (e.g., ConceptNet) will be queried. In order to link or integrate with external knowledge bases, the system can match its own domain needs to a given external knowledge base, for example based on relationships like Is-A, synonyms, etc. For purposes of illustration, if a system is attempting to respond to a finance related query (e.g., "reverse mortgages") for which its internal knowledge graph and the world knowledge graph offer insufficient data on the topic, the system will proceed by fetching definitions of finance related terms from a linked FIBO (Finance Industry Business Ontology), and the subject and predicates are matched in the FIBO and an object is fetched as a result. If the external knowledge base is also unable to offer the necessary information, the system can determine that a follow up question to the user should be generated in which the query is rephrased.

As will be discussed in greater detail below, knowledge graphs may be generated and may be provided that captures the salient knowledge about a particular task. A "node" in the graph can be extracted that represents the collection of word sequences that fall in the same query category or topic. In other words, a node will represent specific objects or subjects that correspond to an aspect or facet of a knowledge base. Simply for purposes of illustration, a 'snippet' or knowledge subgraph 300 representing an excerpt of a larger knowledge graph is presented in FIG. 3. It can be seen that the subgraph 300 includes five nodes comprising a first node 310 (e.g., "Bag"), a second node 320 (e.g., "Delayed Bag"), a third node 330 (e.g., "Hand bag"), a fourth node 340 (e.g., "Check in bag"), and a fifth node 350 (e.g., "Weight"). In this case, each node is generally related to the concept of baggage concerns and general baggage information, for example, for an airline or other travel service.

Figure 3:
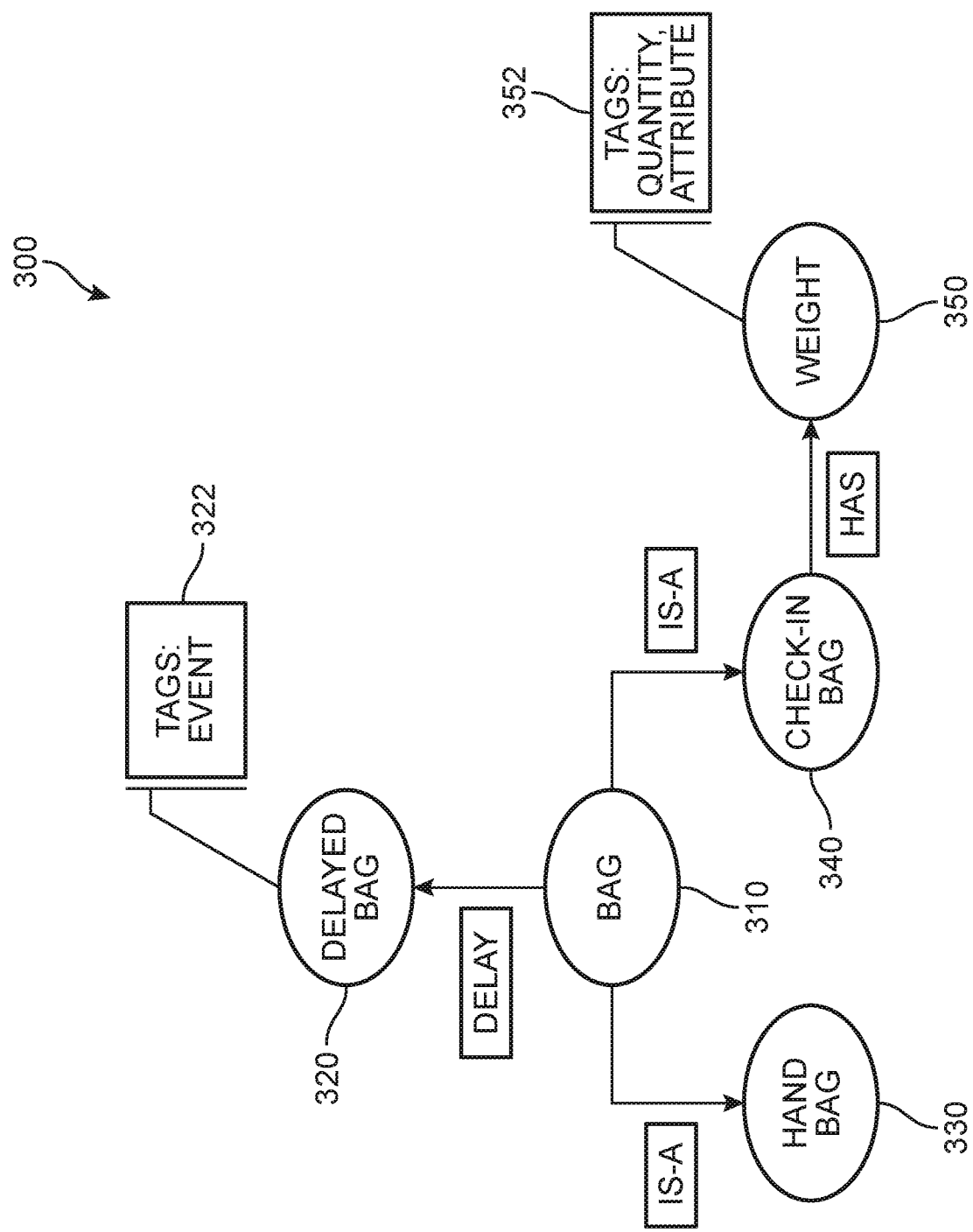
FIG. 3 is an example of a portion of a domain knowledge graph, according to an embodiment.

As can be seen in FIG. 3, the nodes will be connected to other nodes by one or more "edge" lines, also referred to herein as a transitional path or transitional edge. For example, a first node will be connected to a second node by a transitional path. The transitional path represents the association or relationship between the two nodes. Thus, between first node 310 and second node 320 is a path labeled "delay" in the direction toward second node 320 indicating that the second node 320 is a constraint of the first node 310. In another example, between first node 310 and third node 330 and first node 310 and fourth node 340 are two bidirectional paths each labeled "IS-A", indicating that the third node 330 and fourth node 340 are subcategories of the first node 310. A path from fourth node 340 to fifth node 350 is labeled "has" indicating that the fifth node 350 is an attribute or property of the fourth node 340. These relationships can be based on predefined values (domain agnostic relationships), as well as more customized values (domain specific relationships).

Each of the end nodes (second node 320 and fifth node 350) further include tags. A first tag 322 for the second node 320 indicates that second node 320 corresponds to an event for the first node 310, while a second tag 352 for the fifth node 350 indicates that the fifth node 350 corresponds to a quantity as well as an attribute of the fourth node 340. Thus, a tag can reflect a semantic marker for a particular node. It can be appreciated that a chatbot can be configured to access the repository of assembled and classified data in a far more comprehensive knowledge graph directed to precisely interconnecting relationships between a wide array of subject matter, policies, information, descriptions, calculations, and/ or statistics. Additional information regarding the use of knowledge graphs will be discussed with respect to FIGS. 7 and 8 below.

Figure 4:
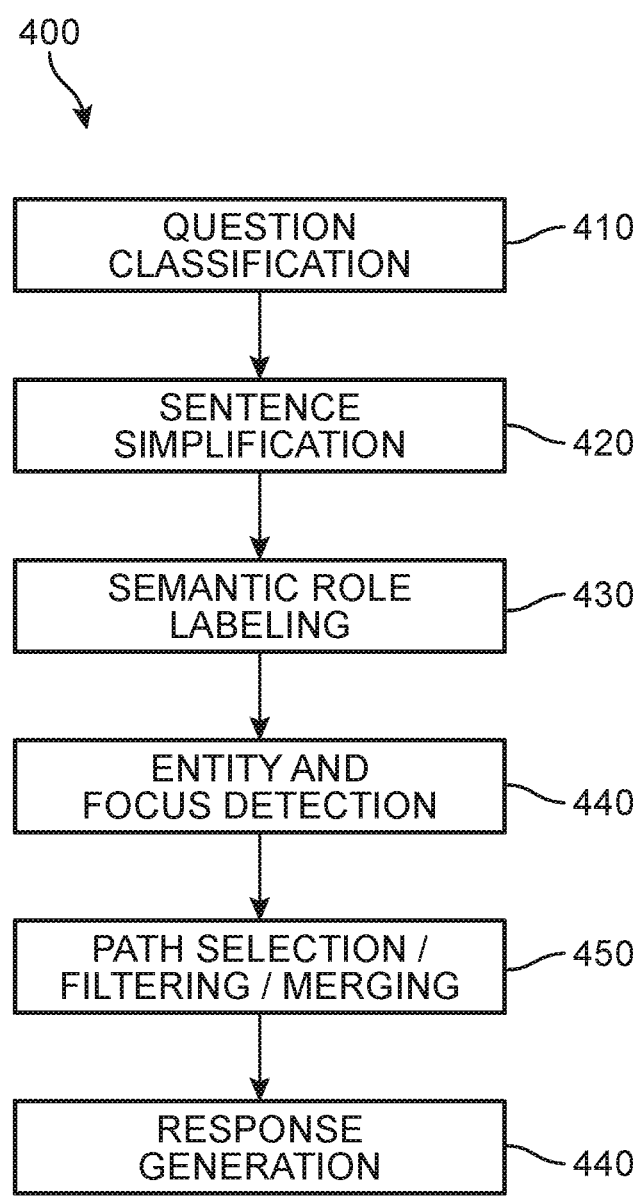
FIG. 4 is a schematic flow diagram of a natural language processing system, according to an embodiment.

Referring now to FIG. 4, a high-level flow diagram illustrates aspects of the natural language and semantic parsing techniques according to some embodiments. In a first stage 410 ("Question Classification"), the user inputted query will be classified (see FIG. 5). A query will typically include at least one clause (i.e., a subject and a predicate/ verb). In different embodiments, the question or other request (referred to broadly as a query) will be processed by a natural language processing technique or model, such as but not limited to, gensim modeling, bag-of-words, TF-IDF (term frequency-inverse document frequency), LSI (latent semantic indexing) and/or word2vec, or other neural network applications. In one exemplary embodiment, the input is processed using a deep learning model Bi-LSTM (Bidirectional-Long-Short-Term-Memory model). The natural language processing technique, used together with an attention pretrained model, are configured to initially determine a query type label for the query (e.g., math type, information, attribute, process type, etc.). In a second stage 420 ("Sentence Simplification"), a rule-driven approach is used to simplify the sentence(s) inputted by the user. During this stage, the system breaks up the user's question into logical clauses to identify the query type. These two initial stages are important as the query type(s) will determine how the system will handle the response.

In a third stage 430 ("Semantic Role Labeling"), the process of semantic role labeling occurs (also referred to as shallow semantic parsing or slot-filling) during which the system assigns labels to words or phrases in a sentence that indicate their semantic role in the sentence, such as that of an agent, goal, result, etc. The process detects one or more semantic arguments associated with the predicate or verb of a sentence and their classification into their specific roles. For example, given a sentence like "What is the price of changing my flight?", the task would be to recognize the verb "changing" as representing the predicate, "my flight" as representing the agent, and "the price" as representing the goods or theme. This is an important step towards making sense of the meaning of a sentence. A semantic analysis further allows for the labeling of the "subject" and "object" functions.

In a fourth stage 440 ("Entity and Focus Detection"), the nouns and verbs are labeled, as well as the focus entity, start entity, and other entities and verbs that may represent values that are to be retrieved from the knowledge graph. In one embodiment, the subject will correspond to the focus or entity, and the predicate will correspond to the relationship or constraint associated with that entity. During a fifth stage 450 ("Path Selection/Filtering/Merging"), the relevant nodes in the knowledge graph are selected, and the appropriate queries are used to locate and retrieve the result(s). Finally, in a sixth stage 460, a response to the query is generated, typically by rearranging the words from the query.

Furthermore, in different embodiments, the proposed systems can include provisions for creating a domain agnostic semantic processing mechanism for handling short user queries (i.e., queries with a single clause or telegram-type queries). In some embodiments, a question classification machine learning model will be implemented in which a hierarchical classifier that is guided by a layered semantic hierarchy of answer types is used to classify questions into fine-grained classes (e.g., based on the Li and Roth TREC Dataset). In one embodiment, additional data is obtained based on general chatbot based questions (definition and affirmation). As one example, the process can include data consolidation and re-defining classes from six coarse classes and 50 fine classes to seven broad distinct classes (see FIG. 5).

In some embodiments, semantically 'useless' or meaningless words in the dataset ("stop words") such as "the", "a", "an", "in" can be ignored, filtered out, and/or removed, improving the indexing of entries for searching and the retrieving of them as the result of a search query. Furthermore, filtering may be used with or without lemmatization and/or stemming algorithms to identify compound words and phrases to be treated as individual words or to produce morphological variants of a root or base word. In addition, in some embodiments, numbers, rare words, and punctuation can be identified. These text processing techniques are used with deep learning (e.g., relationship classifiers such as attention based bidirectional LSTM or other processing tasks that capture the most important semantic information in a sentence) to standardize the inputted data, and prepare the data for the question classification task.

Figure 5:
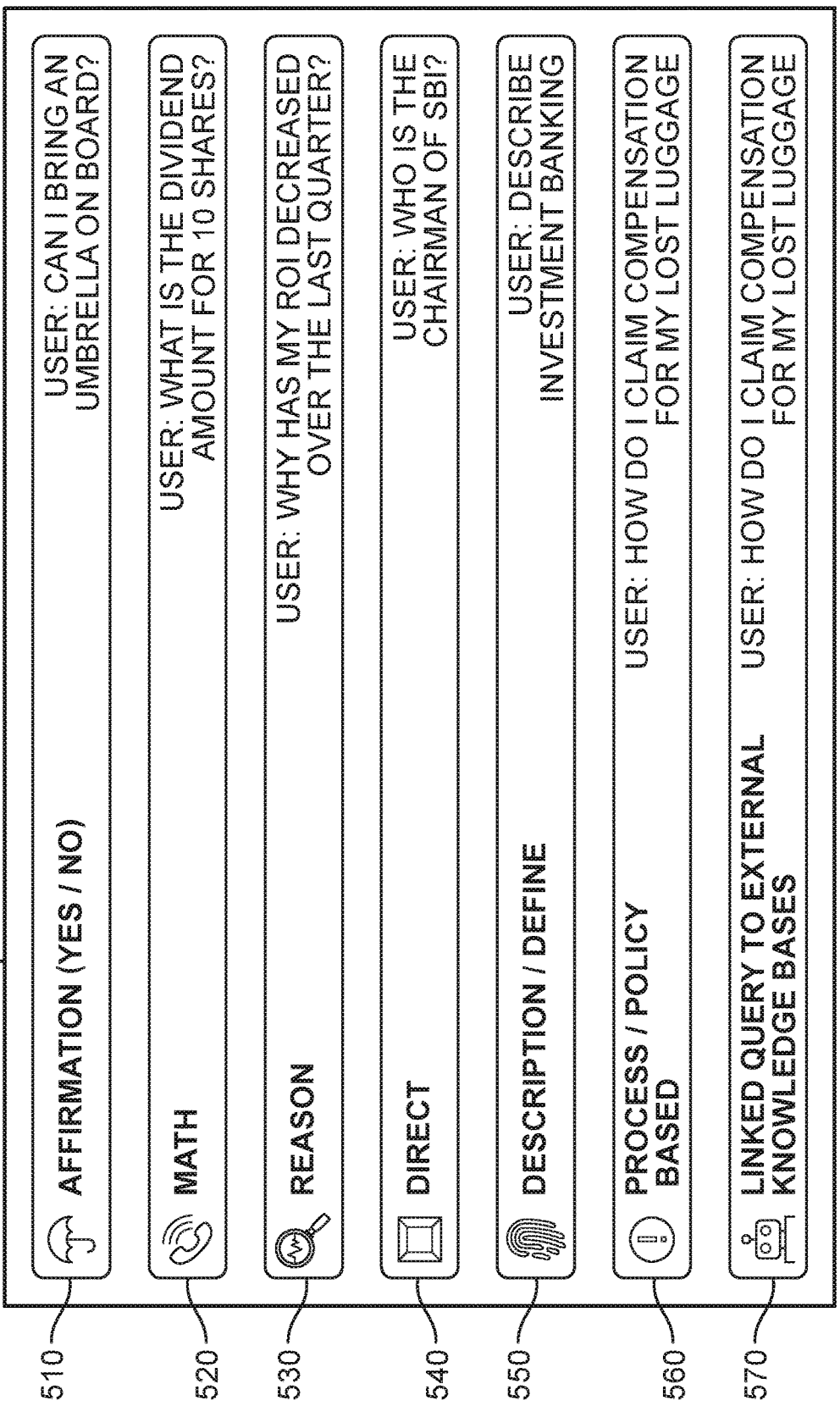
FIG. 5 is a table presenting some examples of classification categories that may be assigned to a query, according to an embodiment.

FIG. 5 presents a table 500 in which an embodiment of seven query classification labels (query types) are introduced. In this example, the labels that may be applied by the system upon determination of the input's semantic structure include a first query type 510 ("Affirmation"), a second query type 520 ("Math"), a third query type 530 ("Reason"), a fourth query type 540 ("Direct"), a fifth query type 550 ("Description/Define"), a sixth query type 560 ("Process/ Policy Based"), and a seventh query type 570 ("Linked Query to External Knowledge Bases"). Where the query includes a question for which a yes or no would provide an appropriate and complete response (e.g., "Can I bring an umbrella on board?"), the system assigns the first query type 510 to the input. The second query type 520 is assigned when the query includes a question for which some mathematical calculation will be needed (e.g., "What is the dividend amount for 10 shares?"). In addition, the third query type 530 is assigned in cases where a user is requesting a reason or explanation (e.g., "Why has my ROI decreased over the last quarter?"), and the fourth query type 540 is assigned when the query includes a direct answer (e.g., "Who is the chairman of SBI?"). The fifth query type 550 is applied in cases where the query includes a request for a description or definition ("Describe investment banking"), while the sixth query type 560 is assigned if the query is directed to a process or policy (e.g., "How do I claim compensation for my lost luggage?"). Finally, the seventh query type 570 is assigned to those queries that do not appear to be answerable by the internal knowledge graph, and may require access to an external knowledge base in order to provide an intelligent response ("Can I carry a hockey stick on board?"). In the last case, the system may for example include information as to whether the user can carry a lacrosse stick, and then access an external knowledge base to find that a hockey stick is sufficiently similar to provide an answer.

For purposes of clarity, some other examples of customer queries that may be offered to a chatbot are described below. These queries can be classified by levels of complexity. For example, Level 1 Queries include basic questions that have yes or no answers, or reflect affirmation query types, and/or can be answered by standard FAQ content such as direct query types or description/define query types (e.g., User: "Do you have flights that go to Rome?"; "What is the hand luggage weight my five year old son can carry onboard a flight?"; "Is a hang-glider allowed as checked in luggage?"; "What are the items banned on board the flight?"; "I am travelling business class, what are the dimensions of the check in bag I can carry?", etc.). Level 2 Queries include questions that involve math-based reasoning, such as math query types, and/or require the integration of multiple facts in order to provide a response (e.g., User: "Can I have check-in three bags?"; "I am travelling with my wife and 15-year old son to Brazil. What is the total weight I am allowed to carry?"; "How much will it cost me to carry a total of 80 kgs as check-in bags?", etc.). Level 3 Queries include questions that trigger layered process or policy-based reasoning (e.g., User: "My luggage seems to have been lost. How do I claim compensation?", etc.). Level 4 Queries include questions that involve common sense reasoning and follow-up questions by the chatbot (e.g., User: "Can I carry a walking stick on board?"; System: "Do you need assistance?", etc.). Level 5 Queries include questions that require the chatbot to seek clarification and learn additional information from the user (e.g., User: "Can I carry a bottle of Hugo Boss onboard?"; System: "I'm not sure. What is 'Hugo Boss'?"; User: "It is a brand of perfume."; System: "You can bring the bottle onboard as long as it is less than 100 ML.", etc.). Level 6 Queries are questions that involve a linked query to an external dataset (e.g., API call).

Figure 6A:
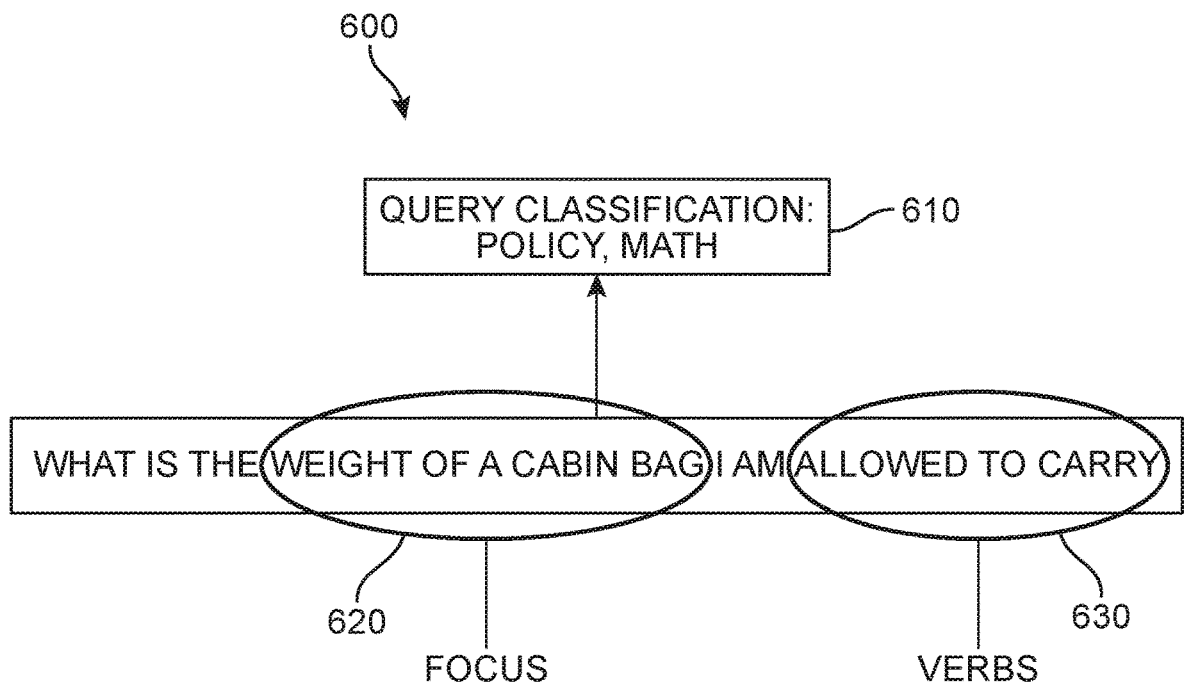
FIGS. 6A and 6B are two examples of a semantic processing technique being applied to a query, according to an embodiment.
Figure 6B:
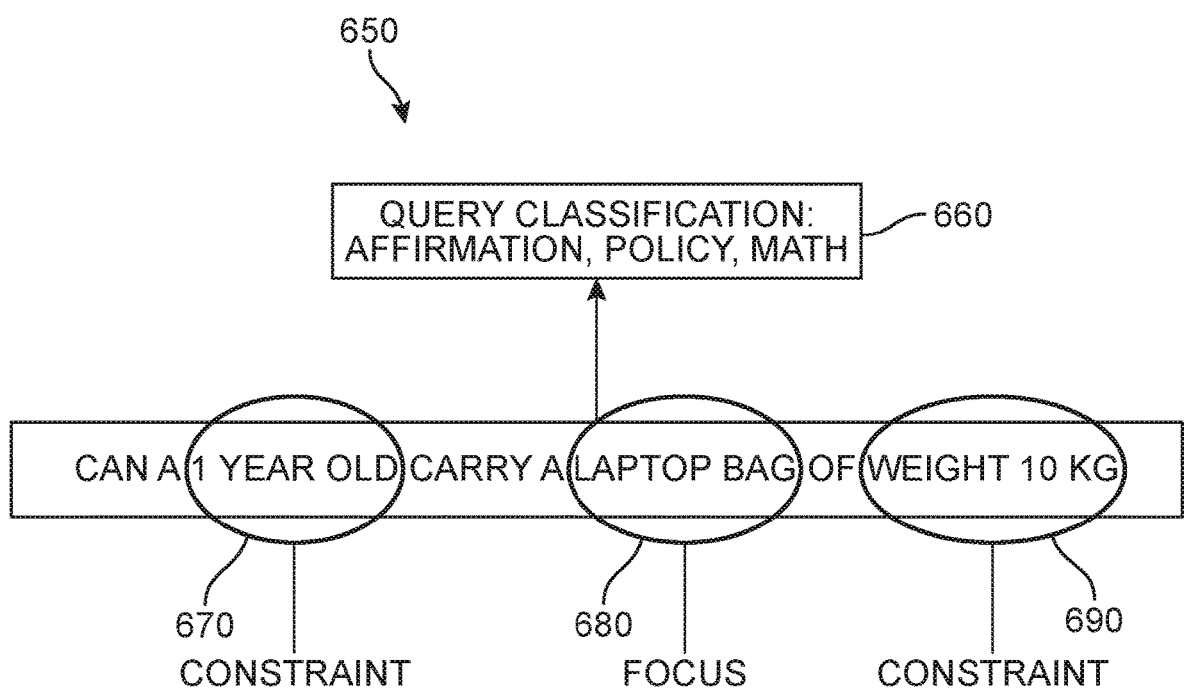

For purposes of clarity, two examples of semantic parsing are provided with respect to FIGS. 6A and 6B. In a first example 600 of FIG. 6A, the received user input or query ("What is the weight of a cabin bag I am allowed to carry?"), semantic parsing has resulted in a query classification 610 of policy and math, based on the identified focus 620 ("weight of a cabin bag") and verbs 630 ("allowed to carry"). Similarly, in a second example 650, semantic parsing has detected a first constraint 670 ("1 year old"), focus 680 ("laptop bag"), and a second constraint 690 ("weight 10 kg") and assigned a query classification 660 of affirmation, math, and policy.

Figure 7:
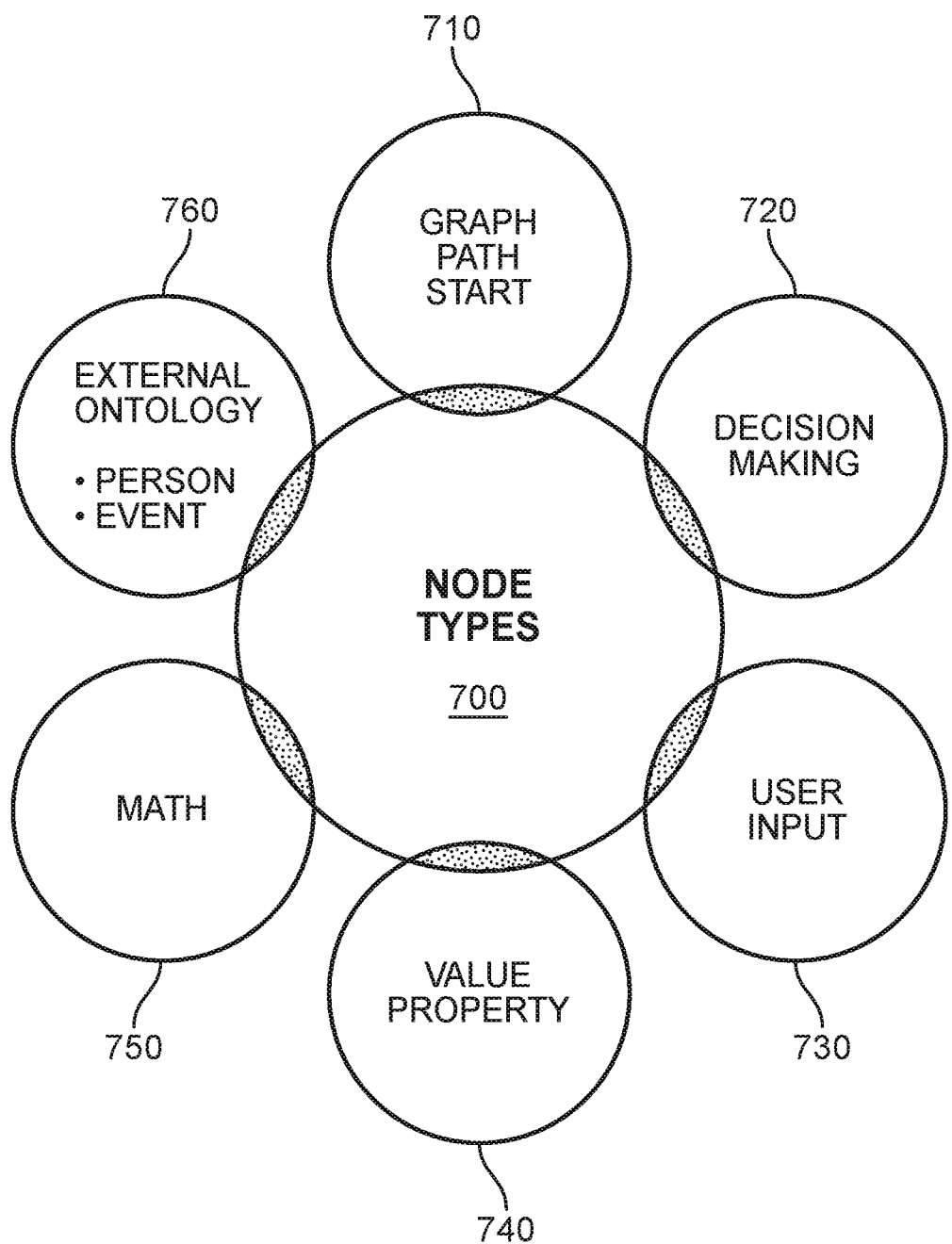
FIG. 7 is a schematic diagram depicting some examples of node types that may be used in a knowledge graph, according to an embodiment.

The relationship between domain semantics and the knowledge graph is now discussed with reference to FIGS. 7 and 8. In FIG. 7, a graph depicting some node types 700 that may be generated in the knowledge graph is presented. This arrangement allows the system to model a domain graph that effectively reflects the domain's semantics and supports an approach for conversational AI. A first node type 710 ("Graph Path Start") represents a base node from which the graph traversal or graph walk is initiated. This node type is important for—and used by—APIs such as Java Traversal and other Tree Traversal algorithms that may be implemented by the system to process a decision-making node in the knowledge graph. The decision making node is a second node type 720 that is used for decision making in the graph, and determining which graph path needs to be traversed across the many different available paths, based on certain conditions. If there is a requirement to obtain additional information (missing values) from the user, then a third node type 730 ("User Input") will be needed. Once the missing values are obtained, the user-provided information is passed back to the second node type 720 for making the actual decision. A fourth node type 740 ("Value Property") refer to nodes that contain information related to a particular value property. For example, some value properties associated with the baggage management domain include length, width, height, weight, dimensions, and number of bags, each linked to different baggage types (e.g., cabin bag, laptop bag, check-in bag, etc.) The fourth node type 740 generally correspond to leaf nodes in the graph. A fifth node type 750 ("Math") refers to nodes reflecting entities that require a mathematical calculation. A sixth node type 760 ("External Ontology: Person, Event") refer to nodes whose types are inherited from external knowledge bases such as PROTON or other external ontologies (see FIG. 3). Each node type will be associated with different policies that can trigger different paths for a given graph walk.

Figure 8:
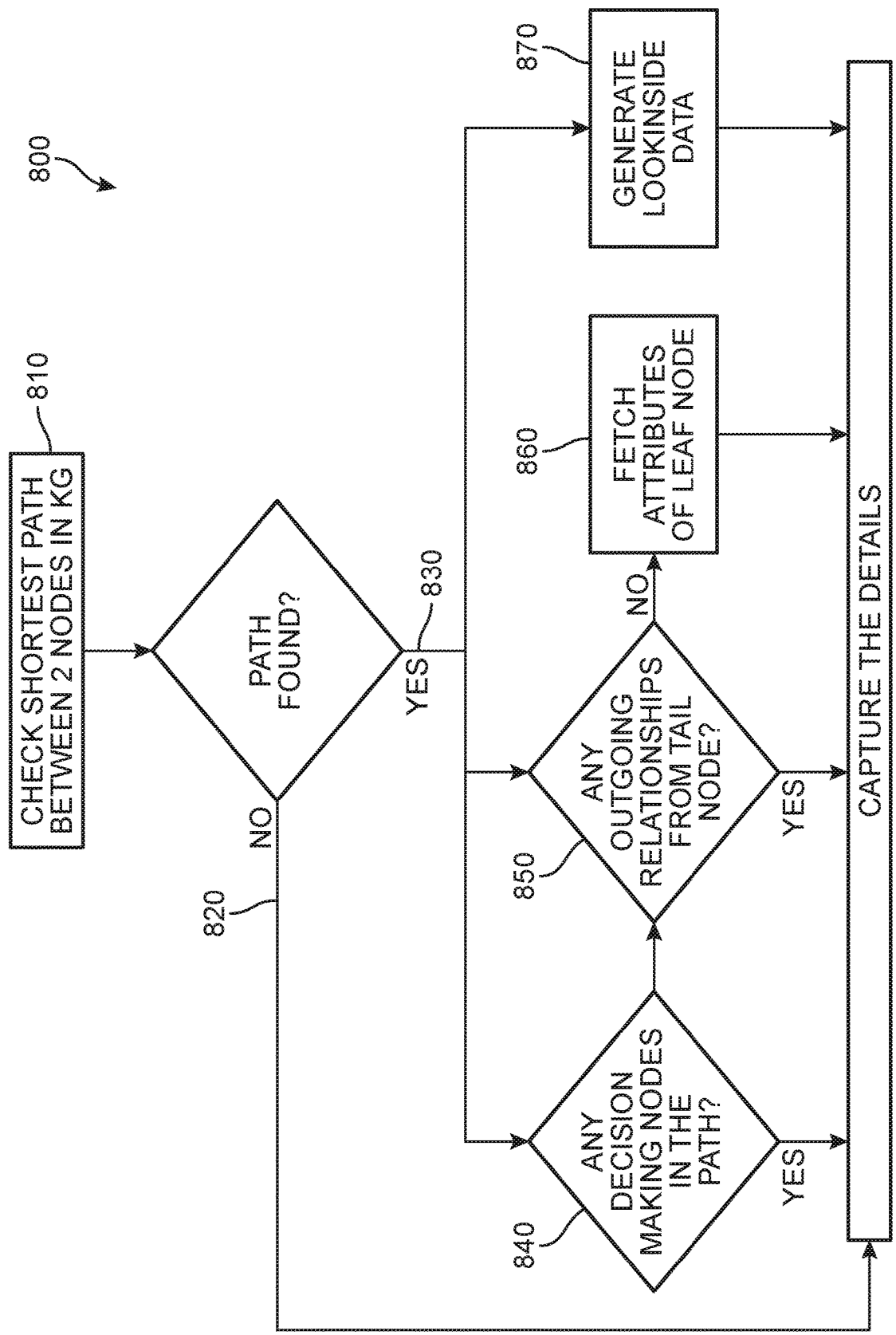
FIG. 8 is a schematic flow diagram of a process of selecting a path in a knowledge graph, according to an embodiment.

FIG. 8 is a process diagram 800 depicting an embodiment of a method of retrieving information pertaining to a response from a knowledge graph. In a first step 810, the system can determine what the shortest path between two of the relevant nodes are in the knowledge graph. If this path cannot be found (second step 820), the system will proceed directly to an attempt to capture details important to the query based on the general semantic meaning of the query. If a path is found (third step 830), various processes may occur based on the node types present in the identified path. For example, in a fourth step 840, the system determines whether the identified path includes any decision-making node types; if so, the system will proceed with capturing the details associated with the decision-making node. Alternatively, if the system determines there are outgoing relationships extending from a tail node, the system will proceed in a fifth step 850 with capturing the details associated with the data stemming from those relationships. If there are no outgoing relationships, the system will instead fetch attributes of a leaf node in a sixth step 860 and base its information capture on those attributes. In addition, in an optional seventh step 870, the system will proceed with generating a visual depiction (e.g., "LookInside" data) representing the portion(s) of the knowledge graph that were explored or used in order to capture the details for the given response (see FIG. 13B).

Figure 9A:
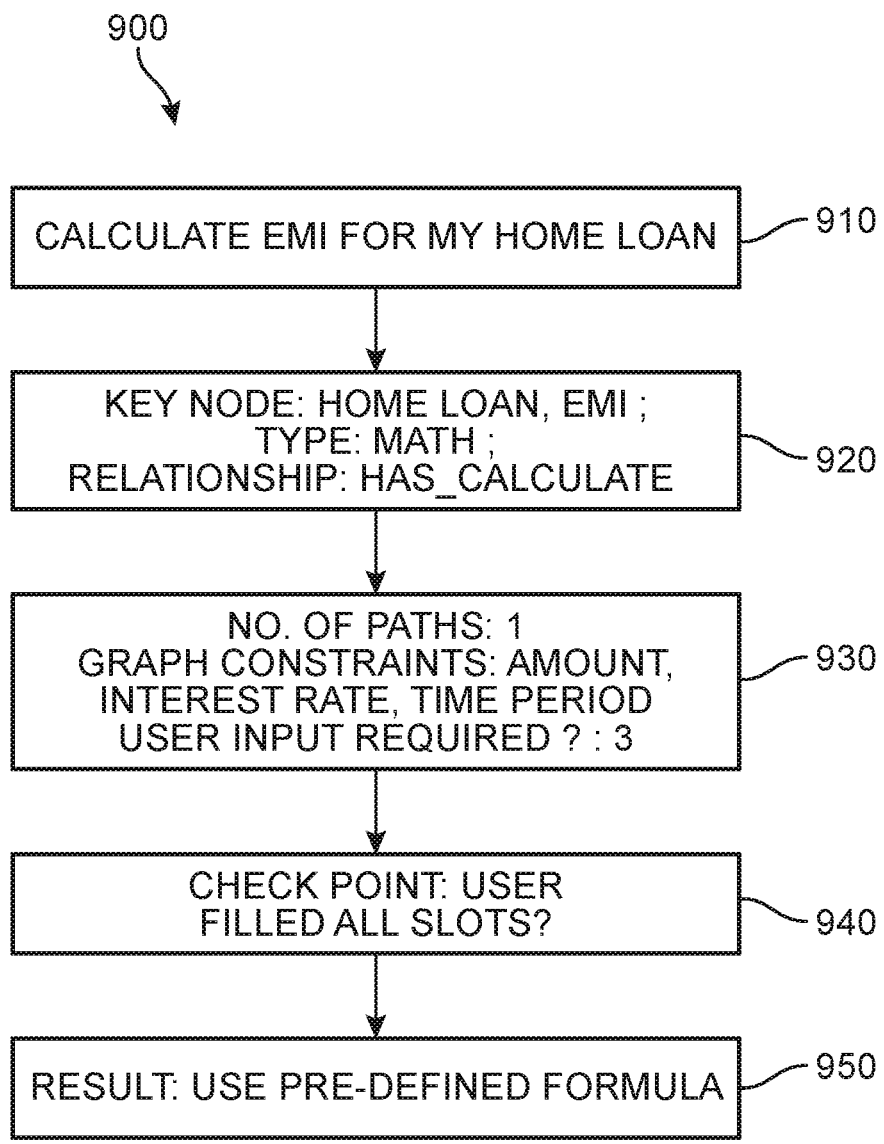
FIGS. 9A and 9B are two examples of a process of extracting semantic content and identifying relevant nodes in the knowledge graph for responding to a query, according to an embodiment.
Figure 9B:
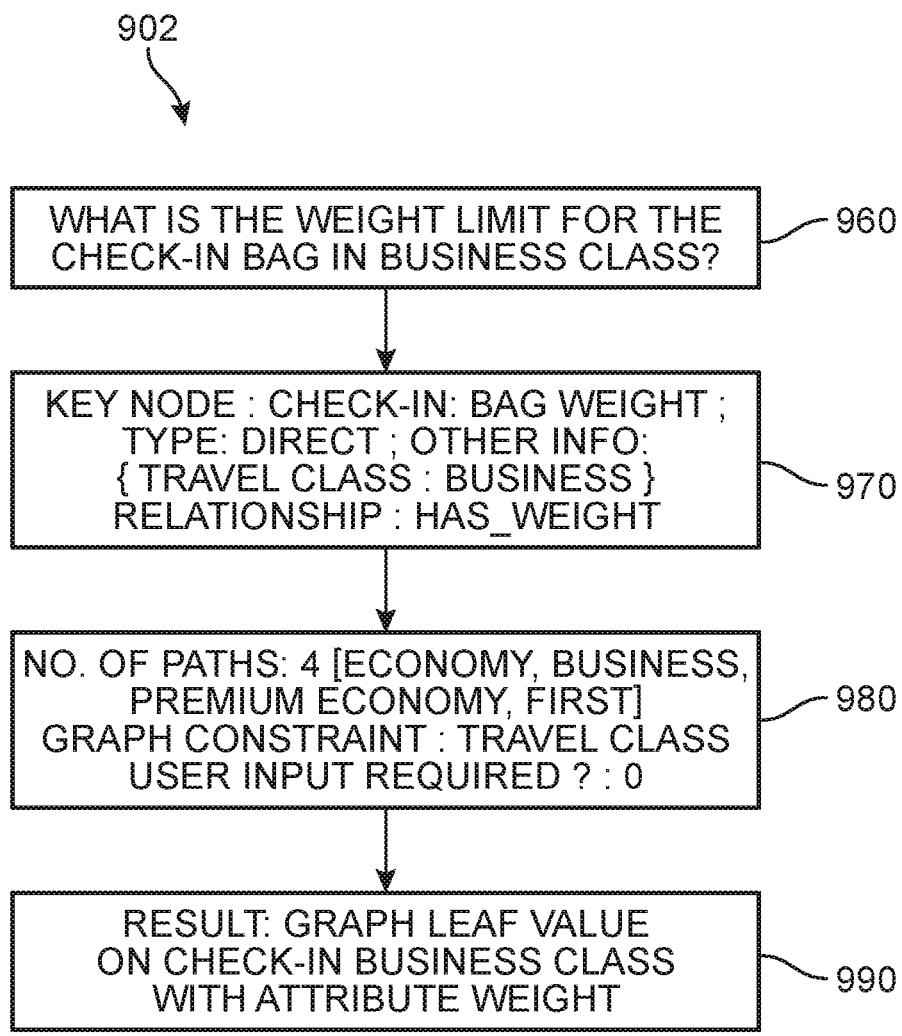

For purposes of clarity, two examples of path selection and filtration are now presented with reference to FIGS. 9A and 9B. In a first example 900, the chatbot receives a request in a first step 910 from a user, "Calculate the EMI for my home loan". In a second step 920, the system identifies the key nodes in the domain knowledge graph for this query as "Home Loan" and "EMI", the query type as Math, and the node relationship or edge line as "Has_Calculate". In a third step 830, one path is found that connects the key nodes, and constraints are identified (Amount, Interest Rate, Time Period). Because these values are determined to be missing, the system recognizes that three further user inputs are required. The system generates a request to the user for these values, and then verifies whether all of the missing values have been filled in a fourth step 940. Finally, in a fifth step 950, the system applies a predefined formula for EMIs obtained from the knowledge graph to generate a response.

In a second example 902, the chatbot receives a question in a first step 960 from a user, "What is the weight limit for the check-in bag in Business Class?". In a second step 970, the system identifies the key node in the domain knowledge graph for this query as "Check-In Bag Weight", the query type as Direct, detects additional pertinent properties including Travel Class: Business, and the node relationship as "Has_Weight". In a third step 980, four paths are found that relate to the key node (Economy, Business, Premium Economy, First), and a constraint is identified related to these paths (Travel Class). The system determines that no values necessary to responding to this query are missing, and moves directly to a fourth step 990 in which the graph leaf value found for check-in bags in business class labeled with the attribute of weight is used to generate the answer.

Figure 10:
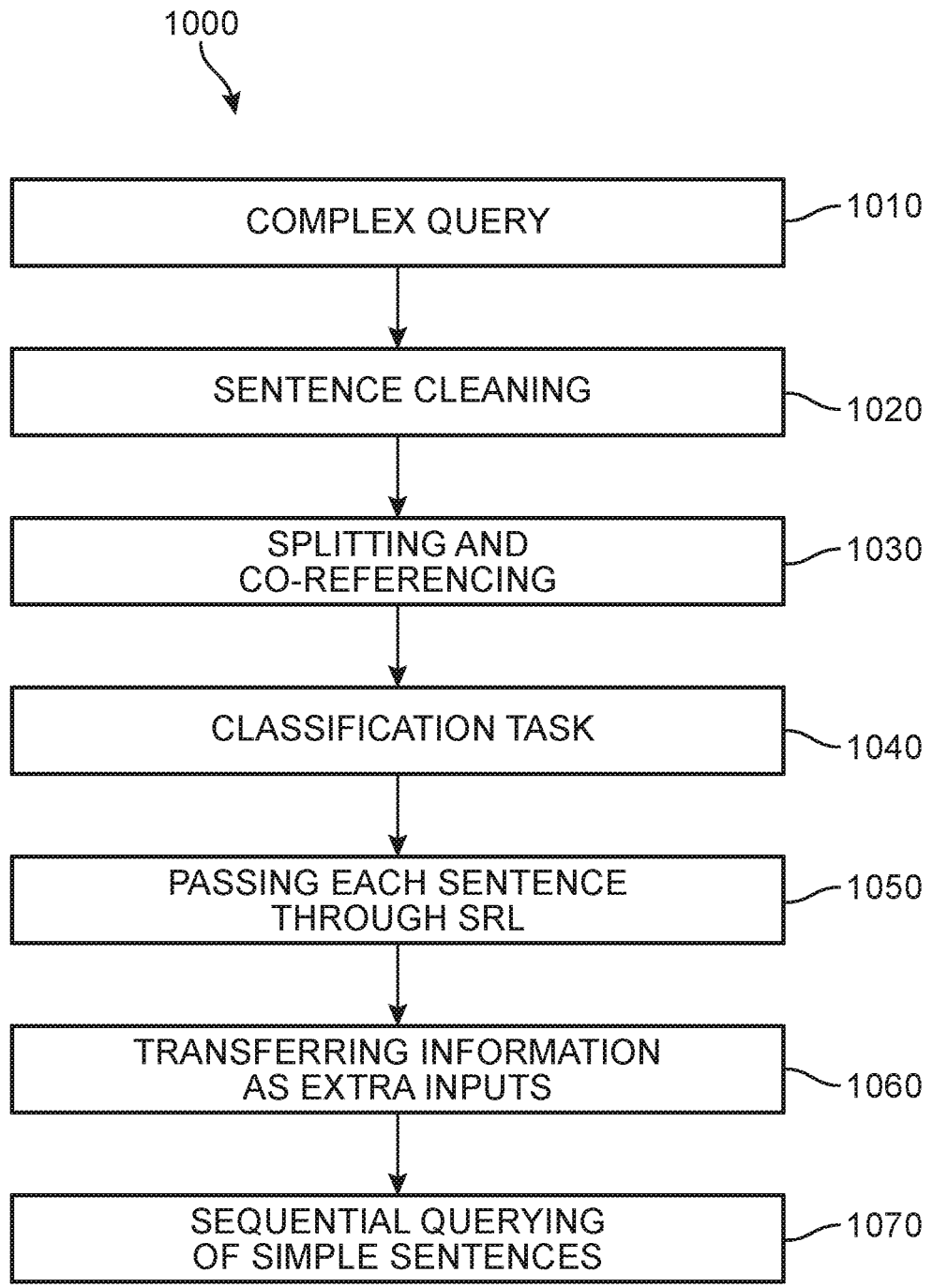
FIG. 10 is a schematic flow diagram of a process of responding to complex queries, according to an embodiment.

In different embodiments, the system may receive more complex queries from a user, such as queries including multiple clauses (i.e., at least one independent clause and one dependent clause). In some embodiments, the approach for simplifying and semantically parsing such complex queries can differ in some respects from the techniques described above. FIG. 10 presents a flow diagram 1000 of an embodiment of a process by which a complex query may be simplified by the proposed systems. As shown in FIG. 10, a complex query 1010 is received by the chatbot, and cleaned 1020 for example by a regex (regular expression) filtering method to remove all special, invalid, and otherwise unwanted characters from the sentence. The remaining characters are divided into multiple simple sentences using a dependency parser and simple heuristics 1030 that can be based on neural networks such as spaCy and AllenNLP that allow for entity recognition. In one embodiment, co-referencing is also implemented to make the simple queries easier to handle. Next, a classification task 1040 is used to identify the query type(s) present in the complex query. Each simplified portion is then passed through a semantic role labeling model 1050 that may be based on AllenNLP and spaCy or other such algorithm services. The results of this model are transferred 1060 as extra inputs to the query, and a sequential querying 1070 of simple sentences are performed.

For purposes of illustration, some examples of this process are described herewith. In a first example, a user may submit a query comprising of "I am on unpaid leave and my 401K loan payment cannot therefore be deducted. What can I do to pay it?". The system analyzes this input and identifies three key parts: (1) "I am on unpaid leave"; (2) "my 401K loan payment cannot therefore be deducted"; and (3) "What can I do to pay my 401K loan payment?". The core question is then determined to correspond to "How do I pay my 401K loan payment?", with the key constraint being unpaid leave.

In a second example, a user may submit a query comprising of "What is my EMI if I have taken a loan amount of $20000 and my fixed interest rate is 10% for a period of 3 years?". The system analyzes this input and identifies three key parts: (1) "What is my EMI?"; (2) "Loan amount of $20000"; and (3) "Fixed interest rate is 10% for a period of 3 years". The core question is then determined as corresponding to "What is my EMI?", with the key constraints being loan amount, interest rate, and time period. In both of these examples, each query has multiple clauses but only a single answer is warranted. The sentence simplification process described herein allows the system to more readily separate and identify the key parts, core question, and constraints of complex queries.

Figure 11:
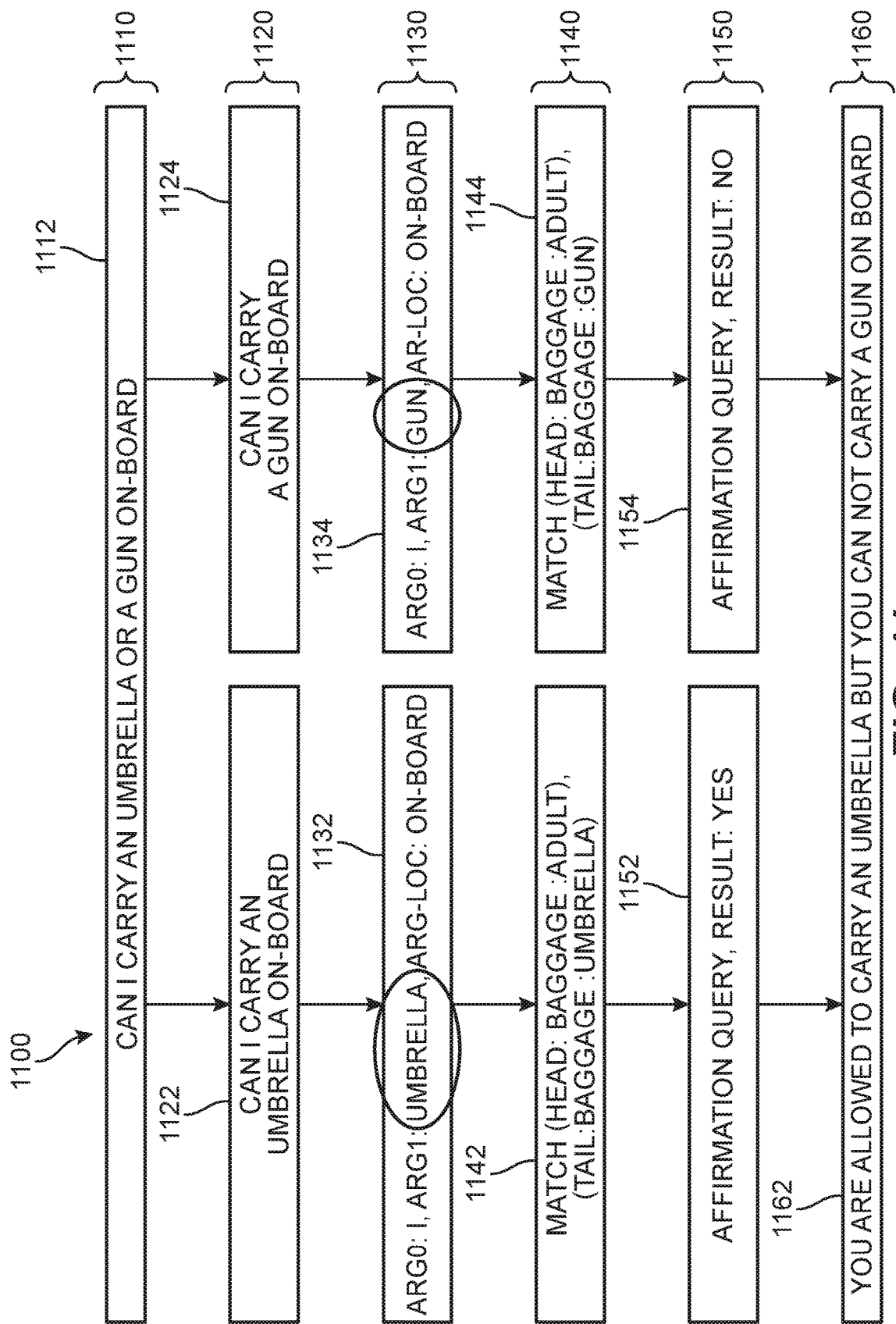
FIG. 11 is an example of a semantic processing technique being applied to a complex query, according to an embodiment.

In addition, in some embodiments, the system is configured to recognize multiple aspects of a query that requires two or more answers. For purposes of clarity, one example of a semantic parsing process 1100 applied to such a complex query 1112 is shown in FIG. 11. In this case, the complex query 1112 comprises "Can I carry an umbrella or a gun on board?" is submitted in a first stage 1110 (Initial Query). In a second stage 1120 (Sentence Splitting), the complex query 1112 is split into two separate sub-queries, including a first sub-query or clause 1122 ("Can I carry an umbrella on-board?") and a second sub-query or clause 1124 ("Can I carry a gun on-board?"). During a third stage 1130 (Semantic Role Labeling (SRL)), arguments (e.g., focus entities and locations) present in each sub-query are identified and labeled. For example, first sub-query 1122 includes an initial argument (ARG0) of "I", a first argument (ARG1) of "Umbrella", and a location argument (ARG-LOC) of "On-Board". Similarly, second sub-query 1124 includes an initial argument (ARG0) of "I", a first argument (ARG1) of "Gun", and a location argument (ARG-LOC) of "On-Board".

A cypher query is conducted in a fourth stage 1140, in which the system explores the knowledge graph and determines the node path for each sub-query. In this case, the first sub-query 1122 has a head node of Baggage: Adult and a tail node of Baggage: Umbrella, and the second sub-query 1124 has a head node of Baggage: Adult, and a tail node of Baggage: Gun. Based on this and other information, in a fifth stage 1150, the system determines that the first sub-query 1122 is an affirmation type query and the response should be Yes, and the second sub-query 1124 is an affirmation type query where the response should be No. At a final sixth stage 1160, the system generates a combined response corresponding to the information obtained in the knowledge graph, comprising of a single statement 1162 "You are allowed to carry an umbrella but you cannot carry a gun on board".

Figure 12:
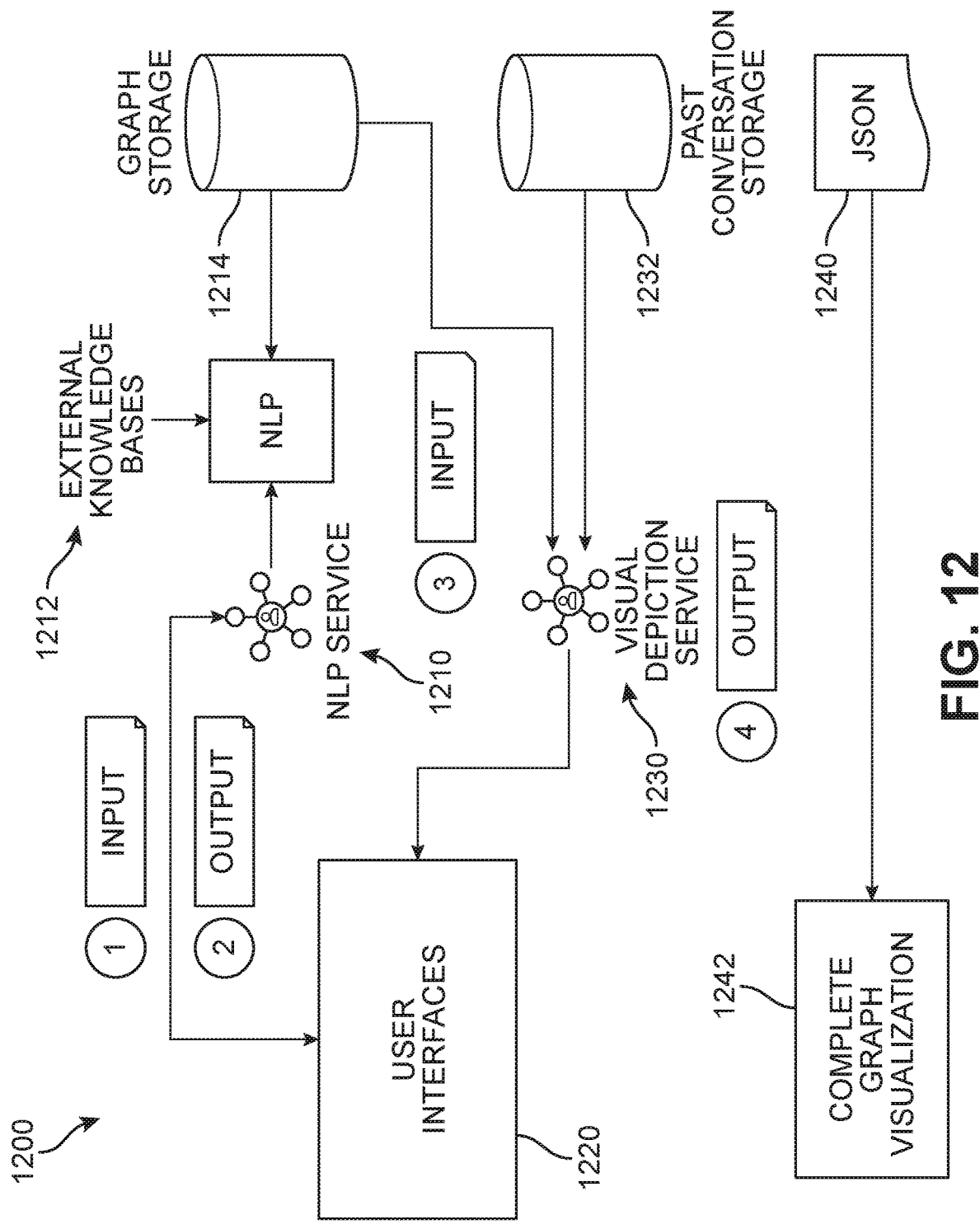
FIG. 12 is a schematic diagram depicting a high-level overview of a technical architecture of the dynamic chatbot system, according to an embodiment.

FIG. 12 present a high-level overview of an embodiment of an architecture 1200 of the proposed systems. In this example, when a user input is initially received by the system, a natural language processing (NLP) service 1210 can process the input, apply semantic parsing, and retrieve an answer with reference to the domain knowledge graph 1214 as well as external knowledge bases 1212. The NLP service 1210 then generates a response based on the retrieved answer and presents an output via a user chat interface 1220. In some embodiments, a visual depiction 1230 of the knowledge sources involved in generating the answer can also be provided to the user chat interface 1220 by inputs from the knowledge graph 1214 and past conversation storage 1232 in which all exchanges between the user and the chatbot during the current conversation session are stored. In one embodiment, the knowledge graph itself can be accessed and visualized 1242, for example by a data serialization format configured to store and exchange data, such as JSON, YAML, Protobuf, Avro, MongoDB, OData, etc.

Figure 13A:
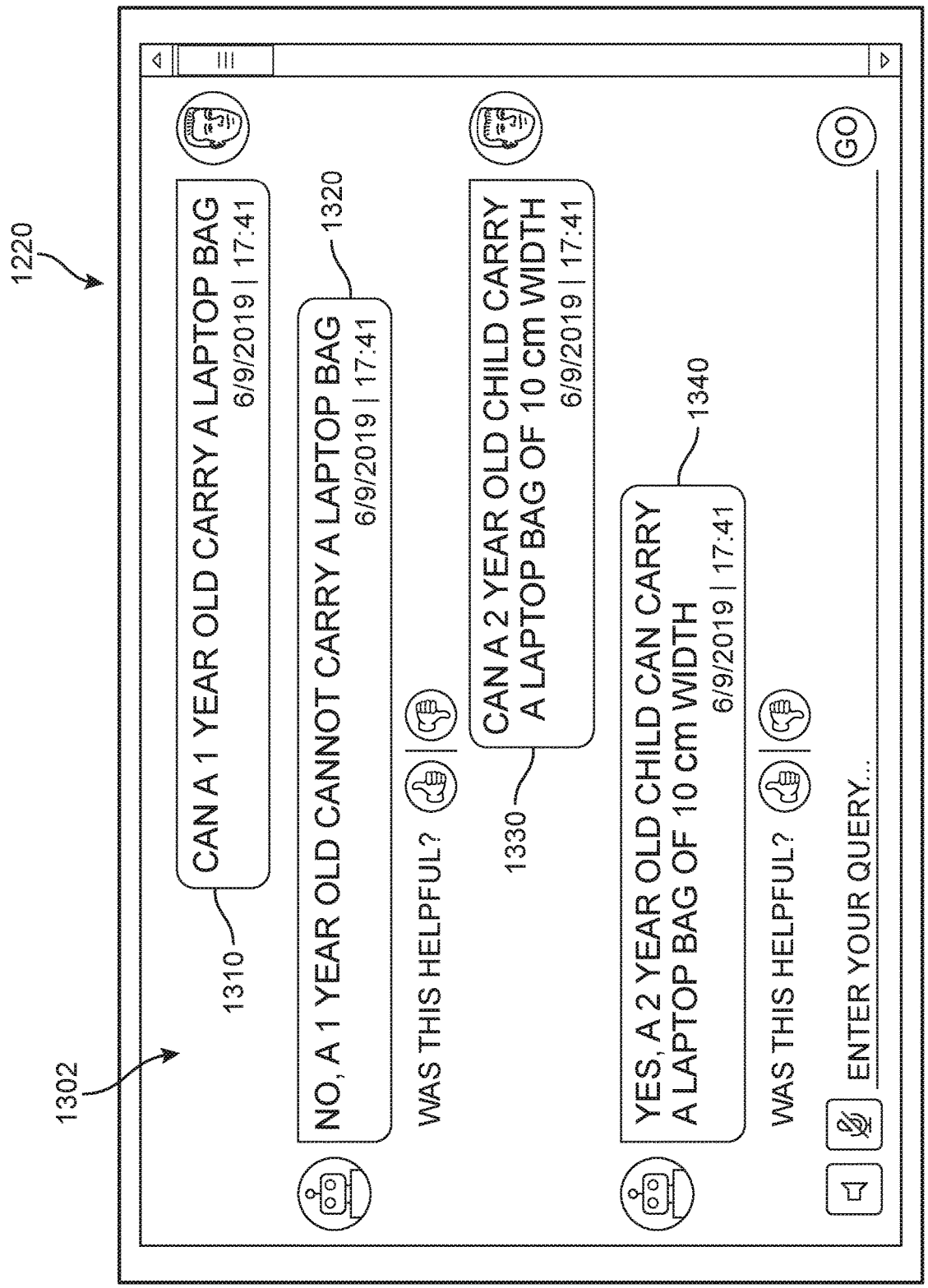
FIGS. 13A and 13B are examples of user interfaces presenting a conversation with a virtual agent and a knowledge graph dashboard.
Figure 13B:
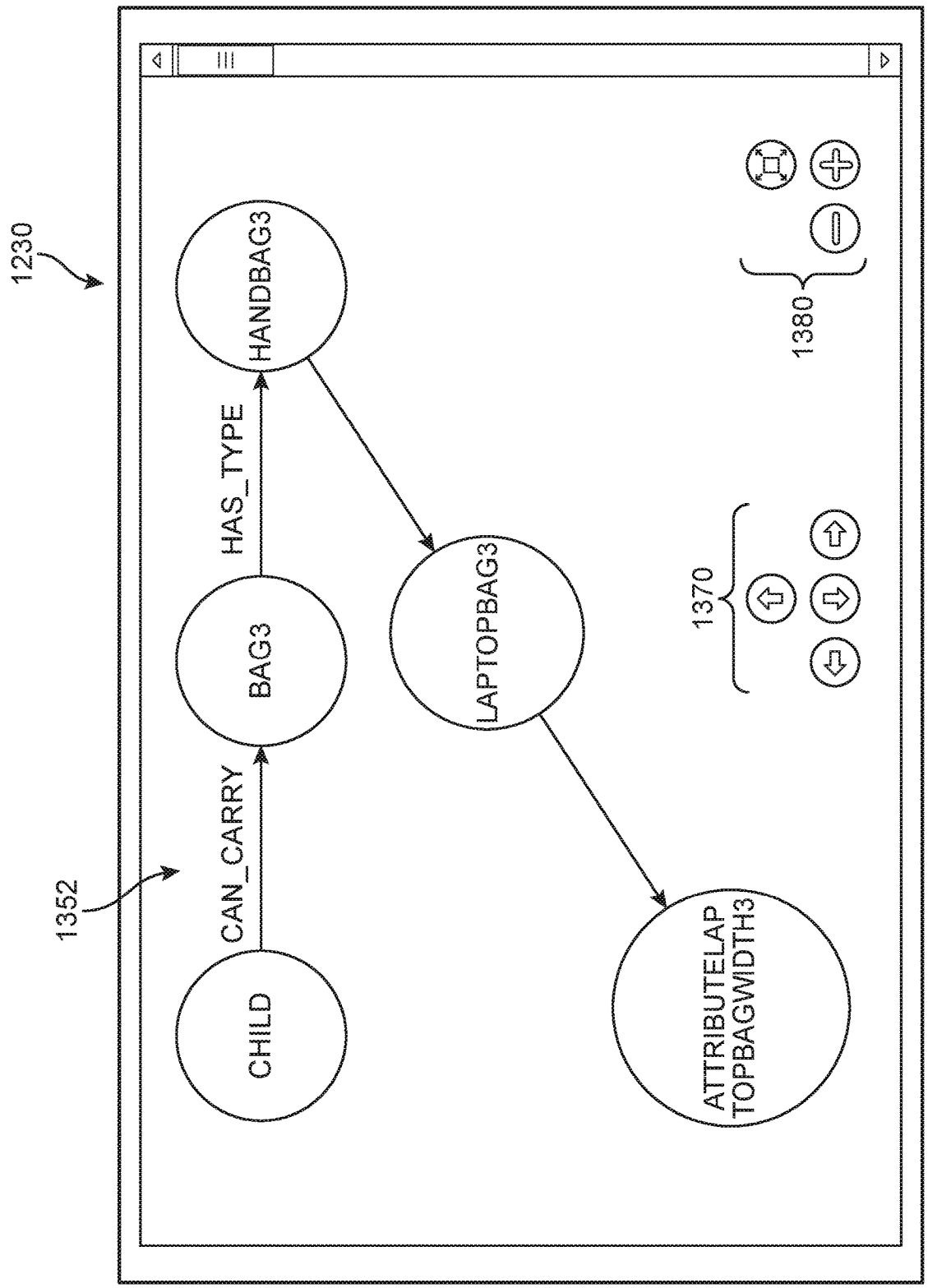

For purposes of illustration, an example of user interface 1220 and an accompanying visual depiction of the pertinent portion of the knowledge graph used in addressing a user's query are now presented in FIGS. 13A and 13B. In FIG. 13A, the user chat interface 1220 includes a conversation pane 1302 in which a chat is occurring between a human end-user and a virtual agent or chatbot. The human end-user has submitted a first query 1310 ("Can a 1 year old carry a laptop bag?"), and the chatbot has generated a first response 1320 ("No, a 1 year old cannot carry a laptop bag"). This is followed by a second query 1330 from the end-user ("Can a 2 year old child carry a laptop bag of 10 cm width?"), to which the chatbot generates a second response 1340 ("Yes, a 2 year old child can carry a laptop bag of 10 cm width").

In some embodiments, the user chat interface 1220 may be accompanied by or include access to a visual depiction interface or other representation of the graph walk used by the system to obtain the correct response. For example, the visual depiction interface 1230 includes a graph portion 1352 in which a plurality of nodes and connecting edges pertinent to the user queries are illustrated. In some embodiments, the visual depiction 1230 can further include navigation options 1370 and/or viewing options 1380 for facilitating exploration of the knowledge graph.

For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

It should be understood that the user interfaces of FIGS. 13A and 13B represent only one possible depiction of interfaces that may be offered to the end-user, and in other embodiments, any variation in presentation style, options, menus, and graphical depictions can be used, including interfaces customized by the end-user to display the desired information. A Settings option can also be displayed to allow the end-user to adjust the interface. In addition, a number of interface layer options may be provided. For example, other options can allow the user to switch to a landing page that presents a brief summary of the user's account or a log of the user's previous activity and/or answers to queries the user had previously submitted.

Figure 14:
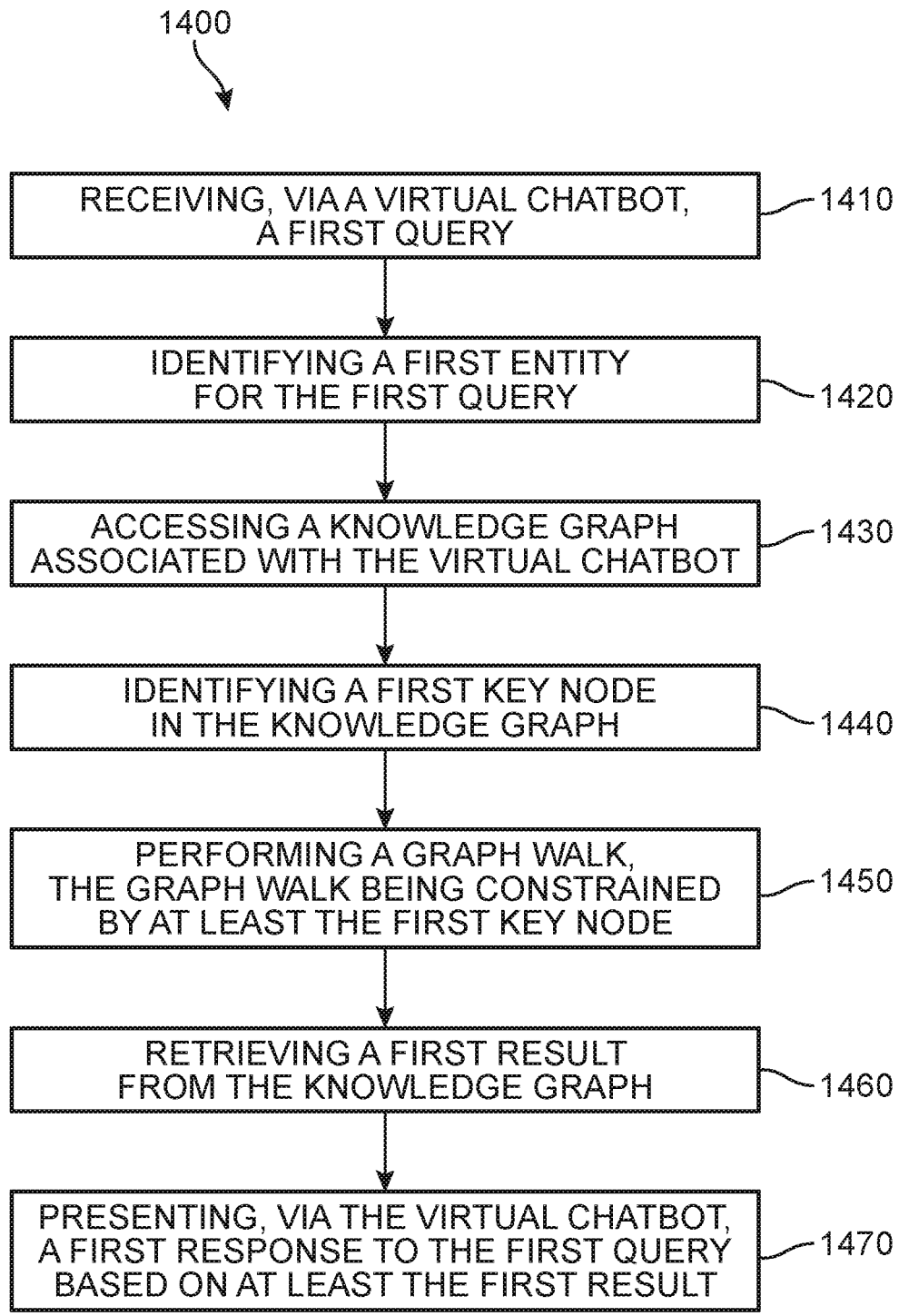
FIG. 14 is a flow chart depicting a method of generating responses to a query.

FIG. 14 is a flow chart illustrating an embodiment of a method 1400 of generating responses to a query via a virtual agent by reference to a domain (internal) knowledge graph. As shown in FIG. 14, a first step 1410 of the method 1400 includes receiving, via a virtual chatbot, a first query, and a second step 1420 of automatically identifying a first entity for the first query. A third step 1430 includes automatically accessing a domain-specific knowledge graph associated with the virtual chatbot, and a fourth step 1430 includes automatically identifying, based on at least the first entity, a first key node in the knowledge graph. The method 1400 further includes a fifth step 1450 of automatically performing a graph walk through a portion of the knowledge graph, the graph walk being constrained by at least the first key node, and a sixth step 1460 of automatically retrieving, via the graph walk, a first result from the knowledge graph. Finally, in a seventh step 1470, the method 1400 involves automatically presenting, via the virtual chatbot, a first response to the first query based on at least the first result.

In other embodiments, the method may include additional steps or aspects. For example, the method can further include steps of automatically classifying the first query as at least a first query type, and selecting a path for the graph walk based in part on the first query type. In different embodiments, the first query type is assigned based on whether the first query is determined to represent one of an affirmation query, math query, reason query, direct query, description query, policy query, and linked query.

In another example, the method further includes automatically extracting a semantic content from the first query by processing of the first query by a natural language understanding system. In such cases, the processing of the first query by the natural language understanding system can include the application of a sentence simplification technique to the first query, the application of a semantic parsing technique to the first query, and/or the application of a semantic role labeling technique to the first query.

In some embodiments, the first query type can include at least two clauses (i.e., complex query). In such cases, the method can also include steps of automatically splitting the first query into at least a first clause and a second clause, where the first clause corresponds to a first sub-query and the second clause corresponds to a second sub-query, automatically retrieving, via the graph walk, a second result from the knowledge graph, where the first result represents a result for the first sub-query and the second result represents a result for the second sub-query, and automatically incorporating both the first result and the second result into the first response when presenting the first response.

In another example, the method may further include steps of automatically identifying, during the graph walk, at least a first constraint that is required in order to respond to the first query, automatically determining the first constraint refers to a first data value that is currently unavailable, automatically presenting, via the chatbot, a request for the first data value, and receiving, via the chatbot, the first data value. In such cases, the first result is also based in part on the received first data value.

In some embodiments, the method can also include steps of automatically identifying a second entity for the first query, automatically determining that the knowledge graph includes insufficient information for addressing a query involving the second entity, automatically accessing an external knowledge base configured to provide information about the second entity, and automatically retrieving the information about the second entity from the external knowledge base. In such cases, the first response will also be based on the retrieved information about the second entity.

With the benefits offered by a knowledge graph, the proposed systems and methods can more readily apply natural language understanding, shifting from conventional machine learning slot-based models that required extensive training to understand user intents and were capable of only detecting nouns and verbs to machine learning that enables semantic parsing. The proposed systems and methods use the knowledge graph as the source of truth, rather than relying on training. As a result, a chatbots will possess a wider range of contextual understanding and more precisely understand the utterance of a user. In addition, domain modeling in knowledge graphs give rise to an inherently simpler and tractable model. Furthermore, because knowledge graphs are dynamic, they enable decision trees at nodes to be scaled and managed more easily. Such dynamicity also supports increased inference by the chatbot, such that automated conversations can re-iterate and question a user to reach the most accurate conclusion. This approach naturally broadens the capacity of the chatbot to dialogue with a customer beyond static or pre-scripted responses, and allows chatbots to both ask and answer complex queries that involve multi-node relationships that require navigation across multiple decision trees and entities (i.e., multiple "hops"). The proposed systems thereby enable fully automated chatbot conversations that provide a dynamic interaction experience with a customer.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A method of generating responses to a query, the method comprising:
   receiving from a first user, via a virtual chatbot, a first query that includes a first clause and a second clause;
   cleaning the first query using a regular expression (regex) filtering method to produce a filtered first query;
   automatically splitting the first query into a first sub-query for the first clause and a second sub-query for the second clause using a dependency parser and neural network-based heuristics;
   identifying a first argument in the first sub-query and a second argument in the second sub-query;
   determining, using a cypher query, a node path for each of the first sub-query and the second sub-query;
   automatically performing a graph walk through a portion of a first-tier knowledge graph associated with the virtual chatbot, the graph walk being constrained by the determined node paths;

automatically identifying, during the graph walk and using semantic parsing, at least a first math-based constraint that is required in order to respond to the first query;

automatically retrieving from the first-tier knowledge graph, via the graph walk, a first result for the first sub-query and a second result for the second sub-query, wherein the first result differs from the second result; and automatically presenting, via the virtual chatbot, a combined response to the first query that combines both the first result and the second result into a single statement that addresses both the first sub-query and the second sub-query.

2. The method of claim 1, further comprising:
automatically classifying the first query as a first query type; and
selecting a path for the graph walk based in part on the first query type.

3. The method of claim 1, further comprising automatically classifying the first query as a first query type that is associated with one of a Boolean label, math label, policy label, and external knowledge base label.

4. The method of claim 1, further comprising:
receiving a second query; and
classifying the second query as a second query type that is associated with an external knowledge base label in response to determining the first-tier knowledge graph is insufficient for responding to the second query.

5. The method of claim 1, further comprising:
receiving a second query;
determining the first-tier knowledge graph is insufficient for responding to the second query;
accessing a second-tier world knowledge graph; and
basing the second response on objects fetched from the second-tier knowledge graph.

6. The method of claim 4, further comprising:
accessing a second-tier world knowledge graph;
determining the second-tier world knowledge graph is insufficient for responding to the second query;
accessing a third-tier external knowledge base; and
basing the second response on objects fetched from the third-tier external knowledge base.

7. The method of claim 1, further comprising co-referencing of the first query by a natural language understanding system.

8. The method of claim 4, further comprising:
receiving a second query;
determining the first-tier knowledge graph is insufficient for responding to the second query;
accessing a second-tier world knowledge graph;
determining the second-tier world knowledge graph is insufficient for responding to the second query;
accessing a third-tier external knowledge base;
determining the third-tier external knowledge graph is insufficient for responding to the second query; and
determining a follow-up question to the user should be generated in which the second query is rephrased.

9. The method of claim 1, further comprising:
automatically determining the first constraint refers to a first data value that is currently unavailable during the graph walk;
automatically presenting, via the chatbot, a request for the first data value;
receiving, via the chatbot, the first data value; and
wherein the first result is based in part on the received first data value.

10. The method of claim 1, further comprising using semantic role labeling to identify arguments in each of the first sub-query and the second sub-query.

11. A system for generating responses to a query, the system comprising:
a processor;
machine-readable media including instructions which, when executed by the processor, cause the processor to:
receive from a first user, via a virtual chatbot, a first query that includes a first clause and a second clause;
clean the first query using a regular expression (regex) filtering method to produce a filtered first query;
automatically split the first query into a first sub-query for the first clause and a second sub-query for the second clause using a dependency parser and neural network-based heuristics;
identify a first argument in the first sub-query and a second argument in the second sub-query;
determine, using a cypher query, a node path for each of the first sub-query and the second sub-query;
automatically perform a graph walk through a portion of a first-tier knowledge graph associated with the virtual chatbot, the graph walk being constrained by the determined node paths;
automatically identify, during the graph walk and using semantic parsing, at least a first math-based constraint that is required in order to respond to the first query;
automatically retrieve from the first-tier knowledge graph, via the graph walk, a first result for the first sub-query and a second result for the second sub-query, wherein the first result differs from the second result; and
automatically present, via the virtual chatbot, a combined response to the first query that combines both the first result and the second result into a single statement that addresses both the first sub-query and the second sub-query.

12. The system of claim 11, wherein the instructions further cause the processor to:
automatically classify the first query as at least a first query type; and
select a path for the graph walk based in part on the first query type.

13. The system of claim 11, wherein the instructions further cause the processor to classify the first query as a first query type that is associated with one of a Boolean label, math label, policy label, and external knowledge base label.

14. The system of claim 11, wherein the instructions further cause the processor to:
receive a second query; and
classify the second query as a second query type that is associated with an external knowledge base label in response to determining the first-tier knowledge graph is insufficient for responding to the second query.

15. The system of claim 11, wherein the instructions further cause the processor to:
receive a second query;
determine the first-tier knowledge graph is insufficient for responding to the second query;
access a second-tier world knowledge graph; and
base the second response on objects fetched from the second-tier knowledge graph.

16. The system of claim 14, wherein the instructions further cause the processor to:
access a second-tier world knowledge graph;

determine the second-tier world knowledge graph is insufficient for responding to the second query;
access a third-tier external knowledge base; and
base the second response on objects fetched from the third-tier external knowledge base.

17. The system of claim 11, wherein the instructions further cause the processor to perform co-referencing of the first query by a natural language understanding system.

18. The system of claim 11, wherein the instructions further cause the processor to:
automatically determine the first constraint refers to a first data value that is currently unavailable during the graph walk;
automatically present, via the chatbot, a request for the first data value;
receive, via the chatbot, the first data value; and
wherein the first result is based in part on the received first data value.

19. The system of claim 11, wherein the instructions further cause the processor to use semantic role labeling to identify arguments in each of the first sub-query and the second sub-query.

20. A system comprising one or more computers and one or more storage devices storing instructions that are operable, when executed by the one or more computers, to cause the one or more computers to:
receive from a first user, via a virtual chatbot, a first query that includes a first clause and a second clause;
clean the first query using a regular expression (regex) filtering method to produce a filtered first query;
automatically split the first query into a first sub-query for the first clause and a second sub-query for the second clause using a dependency parser and neural network-based heuristics;
identify a first argument in the first sub-query and a second argument in the second sub-query;
determine, using a cypher query, a node path for each of the first sub-query and the second sub-query;
automatically perform a graph walk through a portion of a first-tier knowledge graph associated with the virtual chatbot, the graph walk being constrained by the determined node paths;
automatically identify, during the graph walk and using semantic parsing, at least a first math-based constraint that is required in order to respond to the first query;
automatically retrieve from the first-tier knowledge graph, via the graph walk, a first result for the first sub-query and a second result for the second sub-query, wherein the first result differs from the second result; and
automatically present, via the virtual chatbot, a combined response to the first query that combines both the first result and the second result into a single statement that addresses both the first sub-query and the second sub-query.

* * * * *